(12) United States Patent
Pan et al.

(10) Patent No.: US 10,969,633 B2
(45) Date of Patent: Apr. 6, 2021

(54) METHOD OF FABRICATING DISPLAY PANEL

(71) Applicant: Himax Display, Inc., Tainan (TW)

(72) Inventors: Po-Hung Pan, Tainan (TW); Hsing-Lung Wang, Tainan (TW)

(73) Assignee: Himax Display, Inc., Tainan (TW)

( * ) Notice: Subject to any disclaimer, the term of this patent is extended or adjusted under 35 U.S.C. 154(b) by 0 days.

(21) Appl. No.: 16/835,274

(22) Filed: Mar. 30, 2020

(65) Prior Publication Data

US 2020/0310177 A1 Oct. 1, 2020

Related U.S. Application Data

(62) Division of application No. 16/362,710, filed on Mar. 25, 2019.

(51) Int. Cl.
| | |
|---|---|
| *G02F 1/1341* | (2006.01) |
| *G02F 1/1333* | (2006.01) |
| *G02F 1/1337* | (2006.01) |
| *G02F 1/1339* | (2006.01) |
| *G02F 1/1343* | (2006.01) |

(52) U.S. Cl.
CPC ........ *G02F 1/1341* (2013.01); *G02F 1/1337* (2013.01); *G02F 1/1339* (2013.01); *G02F 1/13439* (2013.01); *G02F 1/133345* (2013.01); *G02F 1/13415* (2021.01); *G02F 1/133773* (2021.01)

(58) Field of Classification Search
None
See application file for complete search history.

(56) References Cited

U.S. PATENT DOCUMENTS

| | | | | |
|---|---|---|---|---|
| 9,588,375 | B2 * | 3/2017 | Yun | G02F 1/133377 |
| 2015/0062515 | A1 * | 3/2015 | Tomioka | G02F 1/133345 |
| | | | | 349/123 |
| 2016/0109738 | A1 * | 4/2016 | Lee | G02F 1/1339 |
| | | | | 349/123 |

(Continued)

FOREIGN PATENT DOCUMENTS

| | | | |
|---|---|---|---|
| CN | 103454813 A | * | 12/2013 |
| CN | 107422541 A | * | 12/2017 |
| JP | 2010-152001 A | * | 7/2010 |

*Primary Examiner* — Ryan Crockett
(74) *Attorney, Agent, or Firm* — JCIPRNET

(57) ABSTRACT

A method of fabricating a display panel includes providing a first substrate and a second substrate, forming an alignment material layer on one of the first substrate and the second substrate and patterning the alignment material layer to form an individual central portion, forming a hydrophobic surface extending from an edge of the individual central portion toward an edge of the one of the first substrate and the second substrate, forming a sealant material on the one of the first substrate and the second substrate, dropping a display medium material on the individual central portion, assembling the first substrate and the second substrate with the sealant material and curing the sealant material to form a sealant. A gap separates the sealant material from the individual central portion and the hydrophobic surface extends in the gap. The display medium material is restricted by the hydrophobic surface and does not contact the sealant material.

6 Claims, 19 Drawing Sheets

(56) References Cited

U.S. PATENT DOCUMENTS

| | | | |
|---|---|---|---|
| 2016/0195741 A1* | 7/2016 | Shiau | G02F 1/1337 |
| | | | 349/106 |
| 2016/0202542 A1* | 7/2016 | Kwak | G02F 1/133512 |
| | | | 349/106 |
| 2016/0216563 A1* | 7/2016 | Kim | G02F 1/1339 |
| 2017/0269404 A1* | 9/2017 | Ishikawa | G02F 1/133351 |
| 2018/0267347 A1* | 9/2018 | Tanaka | G02F 1/133719 |
| 2018/0348581 A1* | 12/2018 | Abe | G02F 1/136286 |
| 2018/0371302 A1* | 12/2018 | Mizusaki | G02F 1/133788 |
| 2020/0310177 A1* | 10/2020 | Pan | G02F 1/13439 |

* cited by examiner

METHOD OF FABRICATING DISPLAY PANEL

CROSS-REFERENCE TO RELATED APPLICATION

This application is a divisional application of and claims the priority benefit of U.S. application Ser. No. 16/362,710, filed on Mar. 25, 2019, now pending. The entirety of the above-mentioned patent application is hereby incorporated by reference herein and made a part of this specification.

BACKGROUND OF THE INVENTION

1. Field of the Invention

The present invention generally relates to a manufacturing method, in particular, to a method of fabricating a display panel.

2. Description of Related Art

Liquid crystal display panels generally include a display medium layer including liquid crystal material including liquid crystal molecules. In the manufacturing process of liquid crystal display panels, the display medium layer is sandwiched between a top substrate and a bottom substrate that are attached or assembled together via a sealant or an adhesive. The process typically includes dropping the liquid crystal fluid including the liquid crystal molecules onto either the top or bottom substrate by a dispenser or an ink-jet printer. When a curable material is used as the sealant or adhesive, prior to curing the sealant, the liquid crystal molecules may come into contact with the uncured sealant. Such contact may then affect the physical properties of the liquid crystal material, such as its resistivity or ion content. In other words, the performance of the display may be adversely affected by contaminants formed on contact of the liquid crystal molecules with the uncured sealant.

SUMMARY OF THE INVENTION

A display panel and a manufacturing method thereof is described. The display panel employs a hydrophobic surface to prevent or reduce contamination of the display medium layer due to a contact with the uncured sealant that may adversely affect the performance of the display.

The disclosure provides a display panel including a first substrate, a second substrate, a display medium layer, a sealant, a first alignment layer, a second alignment layer, and a hydrophobic surface. The second substrate is assembled with the first substrate. The display medium layer is disposed between the first substrate and the second substrate. The sealant is disposed between the first substrate and the second substrate and surrounds the display medium layer. The first alignment layer is disposed on the first substrate and between the first substrate and the display medium layer. The second alignment layer is disposed on the second substrate and between the second substrate and the display medium layer. One of the first alignment layer and the second alignment layer has an individual central portion. The hydrophobic surface extends from an edge of the individual central portion toward an edge of the one of the first substrate and the second substrate. The sealant at least extends between the hydrophobic surface and the edge of the one of the first substrate and the second substrate. The hydrophobic surface includes a hydrophobic material that is more hydrophobic than the individual central portion.

In some embodiments, the sealant covers the hydrophobic surface.

In some embodiments, the sealant partially covers the individual central portion.

In some embodiments, the one of the first alignment layer and the second alignment layer further includes an outer portion. A gap separates the outer portion from the individual central portion. The hydrophobic surface extends in the gap.

In some embodiments, the individual central portion and the sealant are separated by a gap and the hydrophobic surface extends in the gap.

In some embodiments, a boundary between the individual central portion and the hydrophobic surface aligns to an edge of the sealant.

In some embodiments, the display panel further includes an underlying hydrophobic surface disposed under the individual central portion. The underlying hydrophobic surface includes a material the same as the hydrophobic surface.

In some embodiments, the display panel further includes an outer hydrophobic surface extending between the hydrophobic surface and the edge of the one of the first substrate and the second substrate. The outer hydrophobic surface includes a material the same as the hydrophobic surface.

In some embodiments, the display panel further includes an inorganic layer disposed on the one of the first substrate and the second substrate. A portion of the inorganic layer has a top surface serving as the hydrophobic surface.

In some embodiments, another portion of the inorganic layer overlaps the individual central portion.

In some embodiments, the portion of the inorganic layer and the other portion of the inorganic layer extend continuously between the one of the first substrate and the second substrate and the one of the first alignment layer and the second alignment layer.

In some embodiments, a thickness of the inorganic layer is different from a thickness of the one of the first alignment layer and the second alignment layer.

In some embodiments, a thickness of the inorganic layer is substantially equal to a thickness of the one of the first alignment layer and the second alignment layer.

In some embodiments, the display panel further includes a first inorganic layer and a second inorganic layer disposed on the one of the first substrate and the second substrate. The first inorganic layer is disposed between the second inorganic layer and the one of the first alignment layer and the second alignment layer. The first inorganic layer has a gap revealing a portion of the second inorganic layer. A top surface of the portion of the second inorganic layer serves as the hydrophobic surface.

In some embodiments, the hydrophobic material includes silanes, fluorinated silanes, long-chain alcohols or acids.

The disclosure further provides a method of fabricating a display panel including the following steps. A first substrate and a second substrate are provided. An alignment material layer is formed on one of the first substrate and the second substrate and each alignment material layer will be patterned to form an individual central portion. A hydrophobic surface is formed. The hydrophobic surface extends from an edge of the individual central portion toward an edge of the one of the first substrate and the second substrate. A sealant material is formed on the one of the first substrate and the second substrate. A gap separates the sealant material from the individual central portion and the hydrophobic surface extends in the gap. A display medium material is dropped on the individual central portion. The display medium material is restricted by the hydrophobic surface and does not contact the sealant material. The first substrate and the second substrate are assembled via the sealant material. The sealant material is cured to form a sealant.

In some embodiments, the hydrophobic surface is formed by performing a hydrophobic modification on a portion of the one of the first substrate and the second substrate, and the gap exposes the portion of the one of the first substrate and the second substrate.

In some embodiments, the method further includes forming an inorganic layer on the one of the first substrate and the second substrate, wherein the gap between the individual central portion and the sealant material exposes the inorganic layer.

In some embodiments, the hydrophobic surface is formed by performing a hydrophobic modification on the inorganic layer.

In some embodiments, the alignment material layer is applied entirely on the one of the first substrate and the second substrate, cured and patterned to form an alignment layer. The alignment layer includes the individual central portion and an outer portion. The gap separates the outer portion from the individual central portion.

In some embodiments, the hydrophobic surface is formed by performing a hydrophobic modification on a portion of the one of the first substrate and the second substrate, wherein the gap exposes the portion.

In view of the above, at least the hydrophobic surface prevents or reduces contamination of the display medium layer by the uncured sealant. An edge of the individual central portion of one of the first alignment layer and the second alignment layer may also help accomplish the same effect. Accordingly, the hydrophobic surface prevents or reduces the degradation in performance of the display that may be caused by contamination of the display medium layer through contact of the display medium layer with the uncured sealant.

BRIEF DESCRIPTION OF THE DRAWINGS

The accompanying drawings are included to provide a further understanding of the invention, and are incorporated in and constitute a part of this specification. The drawings illustrate embodiments of the invention and, together with the descriptions, serve to explain the principles of the invention.

DESCRIPTION OF THE EMBODIMENTS

Figure 1:
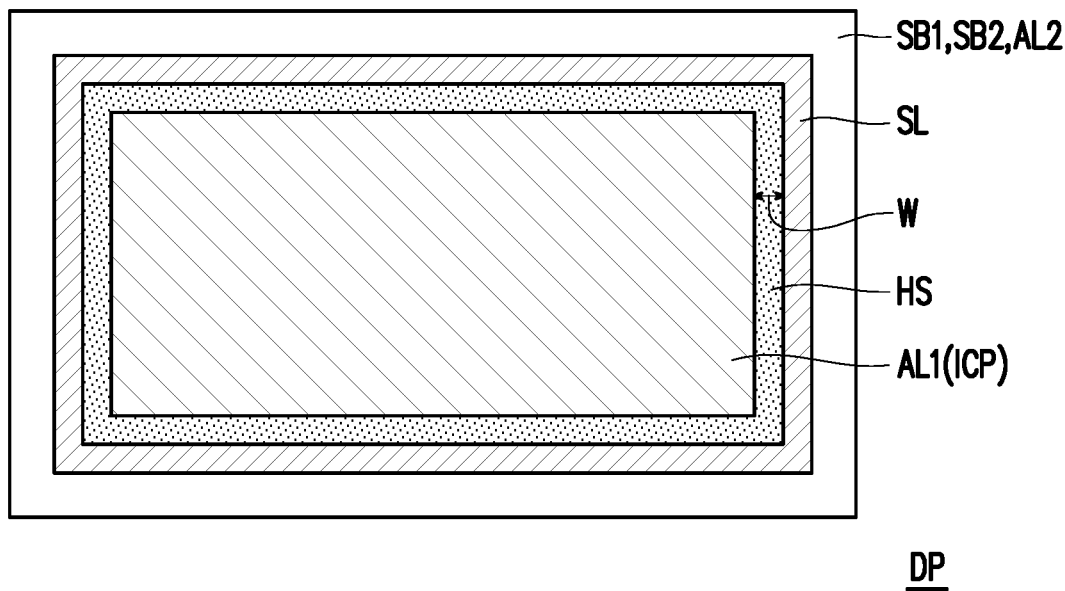
FIG. 1 schematically illustrates a top view of a display panel according to an embodiment of the present disclosure.

Reference will now be made in detail to the present preferred embodiments of the invention, examples of which are illustrated in the accompanying drawings. Wherever possible, the same reference numbers are used in the drawings and the descriptions to refer to the same or like parts.

FIG. 1 schematically illustrates a top view showing some components of a display panel DP. Referring to FIG. 1, the display panel DP includes a first substrate SB1, a second substrate SB2, a sealant SL, a display medium layer (not shown in FIG. 1), a first alignment layer AL1 having an individual central portion ICP, a second alignment layer AL2 and a hydrophobic surface HS. FIG. 1 only shows the relative disposition and location of the components viewed from above, and the stack relationship between the components is not presented. In the embodiment, the first substrate SB1 and the second substrate SB2 are stacked in a top and bottom manner and the shape of the two substrates viewed from above may be substantially the same, such that the outline of the first substrate SB1 and the outline of the second substrate SB2 are aligned as shown in FIG. 1. The individual central portion ICP of the first alignment layer AL1 and the hydrophobic surface HS may be disposed on one of the first substrate SB1 and the second substrate SB2, facing the other of the first substrate SB1 and the second substrate SB2 while the second alignment layer AL2 is disposed on the other of the first substrate SB1 and the second substrate SB2. The sealant SL may be disposed between the first substrate SB1 and the second substrate SB2 to completely surround the display medium layer, such that the display medium layer and the sealant SL are sandwiched between the first substrate SB1 and the second substrate SB2.

As shown in FIG. 1, the hydrophobic surface HS is adjacent to and completely surrounds the individual central portion ICP, and extends outward from the individual central portion ICP by a width W. The hydrophobic surface HS includes a hydrophobic material that is more hydrophobic than the individual central portion ICP of the first alignment layer AL1. The sealant SL at least extends between the hydrophobic surface HS and an edge of the first substrate SB1 or the second substrate SB2. In the embodiment, an inner edge of the sealant SL aligns to an outer edge of the hydrophobic surface HS. However, the present disclosure is not limited thereto. In some embodiments, the sealant SL may extend inward to at least partially cover the hydrophobic surface HS, or may extend further inward to also cover an outer portion of the individual central portion ICP of the first alignment layer AL1.

The hydrophobic surface HS and the sealant SL, as viewed from above, may have a frame-like pattern. At least at a central area of the display panel DP is surrounded by the sealant SL, and the first alignment layer AL1 and the second alignment layer AL2 are in contact with the display medium layer. In some embodiments, the display medium layer is a liquid crystal layer, and the first and second alignment layers AL1 and AL2 may orient the liquid crystal molecules and induce a pre-tilt angle of the liquid crystal molecules.

Figure 2:
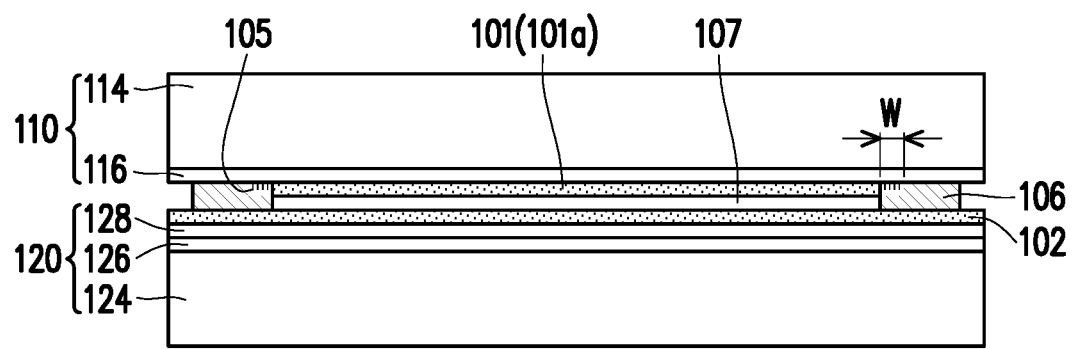
FIG. 2 schematically illustrates a cross section of a display panel according to an embodiment of the present disclosure.

FIG. 2 schematically illustrates a cross section of a display panel 100 according to an embodiment of the present disclosure. Referring to FIG. 2, the display panel 100 includes a first substrate 110, a second substrate 120, a sealant 106, a display medium layer 107, a first alignment layer 101 having an individual central portion 101a, a second alignment layer 102 and a hydrophobic surface 105. The display panel 100 may have a top view similar to the display panel DP in FIG. 1, where the first alignment layer AL1 in FIG. 1 may present the top view of the individual central portion 101a of the first alignment layer 101. In other words, the display panel 100 illustrated in FIG. 2 is similar to the display panel DP illustrated in FIG. 1. Further description of the display panel 100 depicted in FIG. 2 may omit detail that is the same as that of the already described display panel DP of FIG. 1.

In FIG. 2, the first substrate 110 and the second substrate 120 are arranged opposite to each other and the sealant 106 is disposed between the first substrate 110 and the second substrate 120. Specifically, the first substrate 110 and the second substrate 120 are assembled with each other via the sealant 106. The display medium layer 107 is disposed between the first substrate 110 and the second substrate 120 and surrounded by the sealant 106. The display medium layer 107 is encased by the first substrate 110, the second substrate 120 and the sealant 106. The material of the display medium layer 107 may be a liquid crystal material so that the first substrate 110, the second substrate 120, the display medium layer 107 and the sealant 106 may serve as a liquid crystal cell.

The first alignment layer 101 is disposed between the first substrate 110 and the display medium layer 107. In this particular embodiment, the first alignment layer 101 consists of the individual central portion 101a. A hydrophobic surface 105 of the first substrate 110 extends a width W from an edge of the individual central portion 101a outward toward an edge of the first substrate 110. The hydrophobic surface 105 of FIG. 2 may have a top view similar to the hydrophobic surface HS shown in FIG. 1, differing in that the sealant 106 of FIG. 2 may extend to overlap the hydrophobic surface 105. An inner edge of the sealant 106 aligns with a boundary between the individual central portion 101a and the hydrophobic surface 105. The second alignment layer 102 is disposed between the second substrate 120 and the display medium layer 107. Properties of the first alignment layer 101, including a material thereof, may be the same as that of the second alignment layer 102, but the present disclosure is not limited thereto.

The first substrate 110 may include a first support plate 114 and an electrode layer 116 disposed on the first support plate 114. The electrode layer 116 completely covers the surface of the first support plate 114 facing the display medium layer 107; alternatively, the electrode layer 116 may be patterned as required. A material of the first support plate 114 may be glass, quartz, or the like. A material of the electrode layer 116 may be a transparent conductive material, such as indium tin oxide (ITO). The first alignment layer 101 is disposed on the electrode layer 116 opposite the first support plate 114.

The second substrate 120 may be a transistor array substrate including a second support plate 124, an active layer 126 and a passivation layer 128. The active layer 126 is disposed between the second support plate 124 and the display medium layer 107, and the passivation layer 128 is disposed between the active layer 126 and the display medium layer 107. The second support plate 124 may be a glass plate, a silicon backplane or the like. The active layer 126 may be a transistor array such as a thin film transistor array or a CMOS (Complementary Metal-Oxide Semiconductor) device array. The passivation layer 128 may include an oxide or nitride of the material used for the active layer 126 below or other material that is corrosion resistant to protect the active layer 126 from corrosion. The active layer 126 and the electrode layer 116 may provide a driving electric field to drive the display medium layer 107. In some embodiments, the display panel 100 may be a thin-film transistor liquid crystal display (TFT-LCD) panel or an LCoS (liquid crystal on silicon) display panel. In some alternative embodiments, the electrode layer 116 may be omitted based on the driving circuit design of the display panel 100.

The first alignment layer 101 is disposed between the electrode layer 116 and the display medium layer 107. The first alignment layer 101 is disposed on the electrode layer 116, and the electrode layer 116 is sandwiched between the first alignment layer 101 and the first support plate 114.

The second alignment layer 102 is disposed on the passivation layer 128 between the passivation layer 128 and the display medium layer 107. In this particular embodiment, the second alignment layer 102 completely covers the side of the second substrate 120 facing the display medium layer 107.

FIGS. 3A to 3E are schematic cross-sectional views illustrating a manufacturing method of a display panel 200 according to an embodiment of the present disclosure. The manufacturing method of the display panel 200 of FIG. 3E may include the following steps, but the present disclosure is not limited thereto, and the order of the steps is also not limited to the here presented order of steps.

Figure 3A:
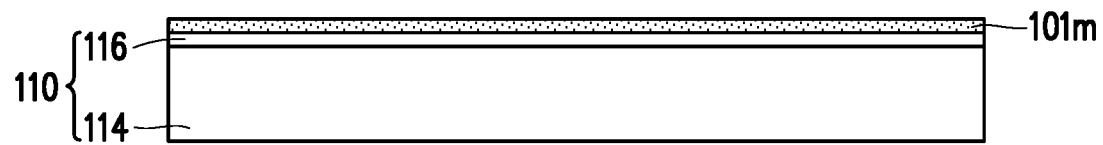
FIGS. 3A to 3E are schematic cross-sectional views illustrating a manufacturing method of a display panel according to an embodiment of the present disclosure.
Figure 3B:
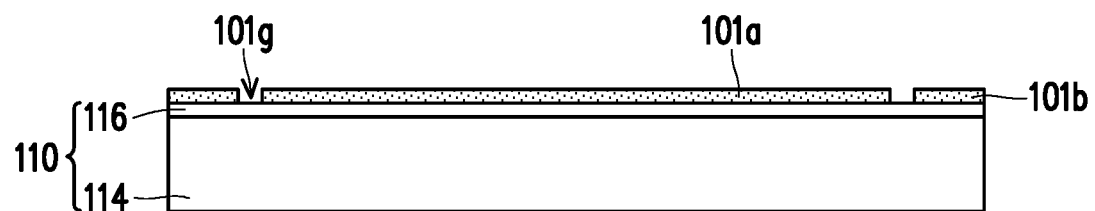

Regarding FIG. 3A, a first substrate 110 including a first support plate 114 and an electrode layer 116 disposed on the first support plate 114 is provided. The first substrate 110 may be similar to that depicted in FIG. 2. A first alignment material layer 101m is disposed on the electrode layer 116 of the first substrate 110. A material of the first alignment material layer 101m may be organic, such as thermally curable or UV-curable polyimide, or inorganic, such as silicon oxide, zinc oxide or a combination thereof Regarding FIG. 3B, the first alignment material layer 101m is patterned to form a first alignment layer 201. However, the present disclosure is not limited thereto. In other embodiments, the first alignment layer 201 may be formed directly as the desired pattern, thereby omitting the patterning step after the forming step. In this particular embodiment, the first alignment layer 201 consists of an individual central portion 101a and an outer portion 101b separate from the individual central portion 101a by a gap 101g. However, the present disclosure is not limited thereto. In other embodiments, the first alignment layer may have a different pattern. The first alignment layer 201 may be otherwise similar to the first alignment layer 101 depicted in FIG. 2. In some embodiments, a material of the first alignment material layer 101m is organic, and the first alignment layer 201 may be formed by a wet process such as spin coating, slit coating, flexographic coating (APR coating) or ink-jet printing. Raw materials used may include polyamic acid or polyimide, which may then be cured to form the first alignment layer 201. A resulting organic material of the first alignment layer 201 may include thermally cured or UV-cured polyimide. In some embodiments, the material of the first alignment material layer 101m is inorganic, and the first alignment layer 201 may, for example, be formed by a sol-gel process or thermal evaporation of the desired material, such as obliquely deposited silicon oxide ($SiO_x$), nanostructured zinc oxide (ZnO) or nanoporous anodic aluminium oxide. The first alignment material layer 101m of inorganic material may be patterned by etching, including wet etching or dry etching such as laser etching or plasma etching to produce the first alignment layer 201. Alternatively, the first alignment layer 201 of inorganic material may be formed directly in the required pattern by, for example, using a shadow mask during the thermal evaporation process to shield areas where the material of the first alignment layer 201 is not desired. In some embodiments, the first alignment layer 201 may have a thickness between around 200 and 2000 angstroms.

Figure 3C:
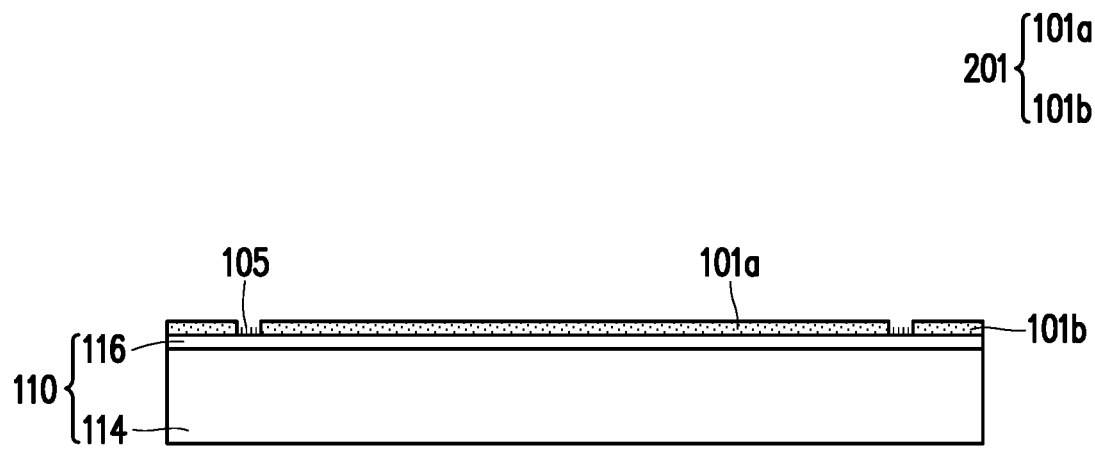

Regarding FIG. 3C, a hydrophobic modification is performed on a surface of the electrode layer 116 exposed by the gap 101g to form a hydrophobic surface 105. The hydrophobic surface 105 may be similar to that depicted in FIG. 2. The hydrophobic modification of the surface of the electrode layer 116 may be performed by disposing a hydrophobic material on the surface by, for example, chemical vapor deposition or ink-jet printing. The hydrophobic material may include silanes, fluorinated silanes, long-chain alcohols or acids. The hydrophobic surface 105 is more hydrophobic than the first alignment layer 201, and may have a water contact angle greater than 60 degrees.

Figure 3D:
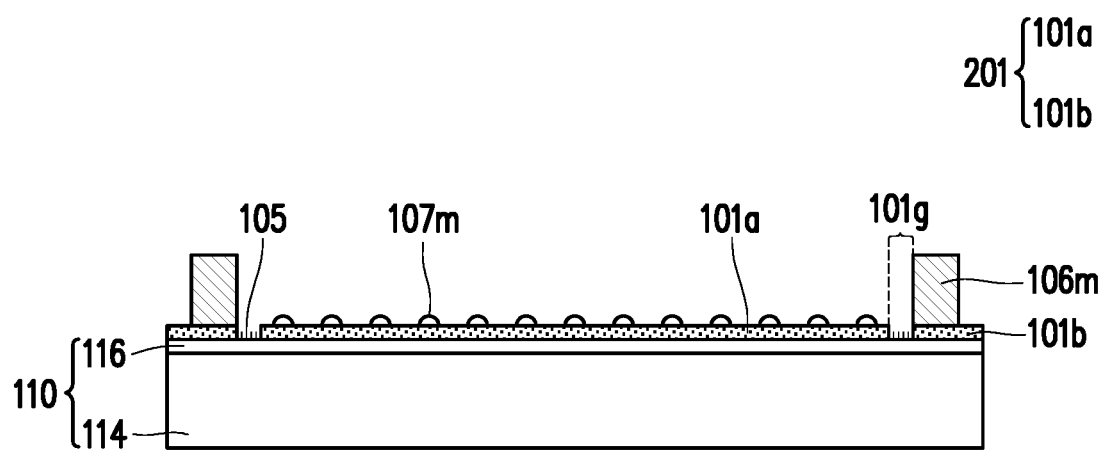

Regarding FIG. 3D, a sealant material 106m is formed on the first substrate 110, wherein the gap 101g separates the sealant material 106m from the individual central portion 101a of the first alignment layer 201. In this particular embodiment, the sealant material 106m is formed on the outer portion 101b of the first alignment layer 201. A display medium material 107m, such as a liquid crystal material, is disposed on the individual central portion 101a of the first alignment layer 201. A spread or flow of the display medium material 107m is restricted by the hydrophobic surface 105, such that the display medium material 107m does not contact the sealant material 106m. The display medium material 107m may be disposed on the individual central portion 101a via a one drop filling (ODF) process, but the present disclosure is not limited thereto.

In some embodiments, the display panel 100 or 200, or the display panels described in the following may be manufactured from a mother panel. The mother panel may include a plurality of display units and each of the display units of the mother panel is cut to from one display panel. During the one drop filling (ODF) process, the display medium material is dropped on each of the display units in sequence. Accordingly, some of the display units receive the display medium material earlier than other display units, such that during the dropping step of the display medium material, the display medium material is in contact with the uncured sealant material for longer in some of the display units. However, in the embodiment, the hydrophobic surface 105 restricts the spreading of the display medium material 107m, such that contact of the display medium material 107m with the uncured sealant material 106m is minimized. As such, the contamination of the display medium material 107m with the uncured sealant material 106m may be avoided or minimized.

Figure 3E:
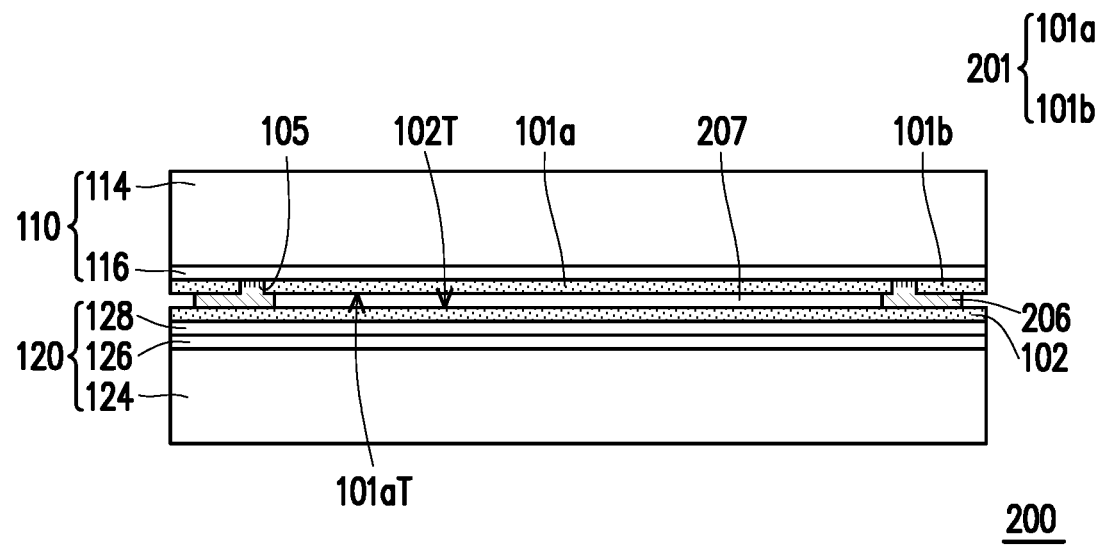

Regarding FIG. 3E, a second substrate 120 including a second support plate 124, an active layer 126 and a passivation layer 128 is provided. A second alignment layer 102 is formed on the passivation layer 128 of the second substrate 120. The second substrate 120 and the second alignment layer 102 may be similar to those depicted in FIG. 2. A material of the second alignment layer 102 may be the same as that of the first alignment layer 201, but the present disclosure is not limited thereto. The formation process of the second alignment layer 102 may differ from that of the first alignment layer 201 in that the pattern formed may be different. For instance, in this particular embodiment, the second alignment layer 102 completely covers the top surface of the passivation layer 128 and does not undergo any further patterning.

Thereafter, the first substrate 110 and the second substrate 120 are assembled via the sealant material 106m. The sealant material 106m may include a curable material, such as a light or thermally curable material. A light or thermal curing step may be performed after joining the first substrate 110 and the second substrate 120 via the sealant material 106m to form a sealant 206. The display medium material 107m may fill a display medium space surrounded by the sealant 206, the first substrate 110 and the second substrate 120 to form a display medium layer 207. The sealant 206 and the display medium layer 207 may be similar to the sealant 106 and the display medium layer 107 of the display panel 100 of FIG. 2.

A surface 101aT of the first alignment layer 201 and a surface 102T of the second alignment layer 102 are in direct contact with the display medium layer 207. In some embodiments, a material of the first alignment layer 201 and the second alignment layer 102 is silicon oxide and at least one of the surfaces 101aT and 102T may be cleaned, for example, by wet cleaning process with water jet, prior to assembly of the display panel 200. When cleaned, the surfaces 101aT and 102T may have a water contact angle of about 5 degrees or less, which compares with a water contact angle between 20 and 40 degrees when not cleaned. A smaller water contact angle may facilitate a uniform pre-tilt angle of the material of the display medium layer 207 such as liquid crystals.

Also prior to assembly of the first substrate 110 and the second substrate 120 using the sealant 206, a quantity and a position of the display medium material 107m and the sealant material 106m deposited on the first alignment layer 201, as shown in FIG. 3D, may be adjusted in order to achieve a desired size and position of the sealant 206 and the display medium layer 207 in the assembled display panel 200. During the assembling step, the first substrate 110 and the second substrate 120 may be positioned at opposite sides of the sealant material 106m and the sealant material 106m may be compressed and cured. Therefore, the width of the cured sealant 206 may be different from the uncured sealant material 106m. In this particular embodiment illustrated in FIG. 3E, after the compressing and curing, the sealant 206 of the display panel 200 covers the hydrophobic surface 105, partially covers the individual central portion 101a of the first alignment layer 201 and extends toward the outer edge of the outer portion 101b of the first alignment layer 201. An area of the sealant 206 covering a portion of the individual central portion 101a, the hydrophobic surface 105 and a portion of the outer portion 101b is approximately the same as an opposite area of the sealant 206 covering a portion of the second alignment layer 102. The display panel 100 of FIG. 2 may be fabricated by a method similar to the method depicted in FIGS. 3A to 3E, at least differing in that the amount of the sealant material 106m and the drop position of the display medium material 107m may be adjusted so that the cured sealant 106 shown in FIG. 2 does not cover a top surface of the individual central portion 101a of the first alignment layer 101.

FIGS. 4 to 8 each schematically illustrate a cross section of a display panel according to an embodiment of the present disclosure. Regarding FIGS. 4 to 8, each of the display panels 300 to 700 is similar to the display panel 200 of FIG. 3E. Each of the display panels 300 to 700 includes a first substrate 110, a second substrate 120 and a hydrophobic surface 105. The display panel 300 in FIG. 4 further includes a sealant 306, a display medium layer 207, a first alignment layer 301 having an individual central portion 101a and an outer portion 301b and a second alignment layer 102. The display panel 400 in FIG. 5 further includes a sealant 406, a display medium layer 207, a first alignment layer 201 having an individual central portion 101a and an outer portion 101b and a second alignment layer 202. The display panel 500 in FIG. 6 further includes a sealant 506, a display medium layer 207, a first alignment layer 201 having an individual central portion 101a and an outer portion 101b and a second alignment layer 302. The display panel 600 in FIG. 7 further includes a sealant 606, a display medium layer 307, a first alignment layer 201 having an individual central portion 101a and an outer portion 101b and a second alignment layer 102. The display panel 700 in FIG. 8 further includes a sealant 706, a display medium layer 407, a first alignment layer 201 having an individual central portion 101a and an outer portion 101b and a second alignment layer 102. The first substrate 110, the second substrate 120, the respective sealant, the respective display medium layer, the respective first alignment layer, the respective second alignment layer and the hydrophobic surface 105 may be similar to those depicted in FIG. 3E. Each of the display panels 300 to 700 of FIGS. 4 to 8 will be described in turn omitting detail that is the same as that of the display panel 200 of FIG. 3E.

Figure 4:
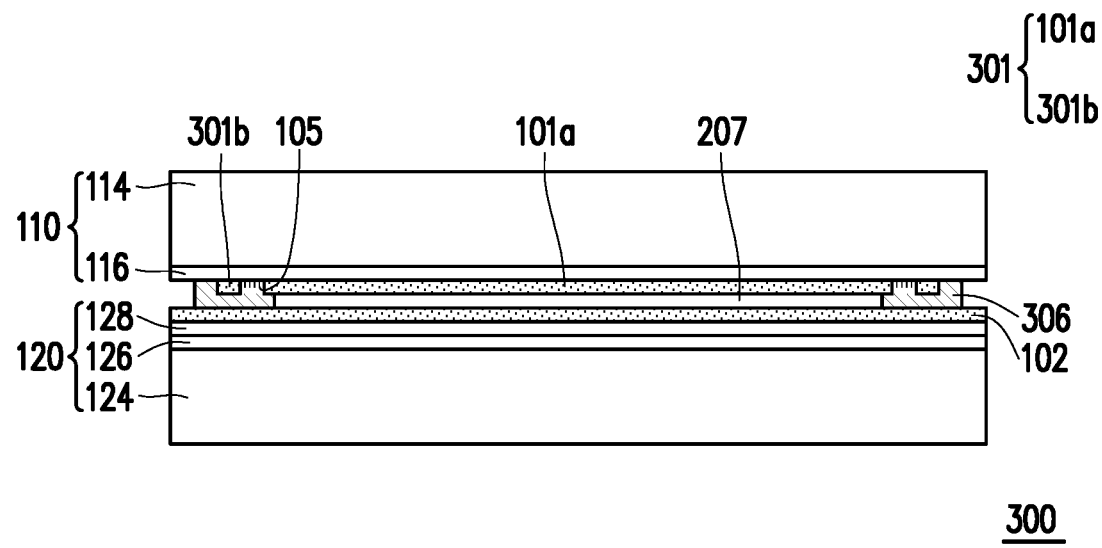
FIGS. 4 to 8 each schematically illustrate a cross section of a display panel according to an embodiment of the present disclosure.

Regarding FIG. 4, the display panel 300 differs from the display panel 200 of FIG. 3E in that the outer portion 301b of the first alignment layer 301 extends from the hydrophobic surface 105 toward an edge of the first substrate 110, but does not reach the outer edge of the first substrate 110. Also particular to this embodiment, the sealant 306 of the display panel 300 covers the top and side surfaces of the outer portion 301b that are exposed after formation of the first alignment layer 301. However, the present disclosure is not limited thereto. The first alignment layer 301 is formed in a similar manner to the first alignment layer 201 of the display panel 200 of FIG. 3E, wherein the first alignment layer 301 is patterned to the required pattern after being formed or formed directly in the required pattern, as described for the formation of the gap 101g in FIG. 3B.

Figure 5:
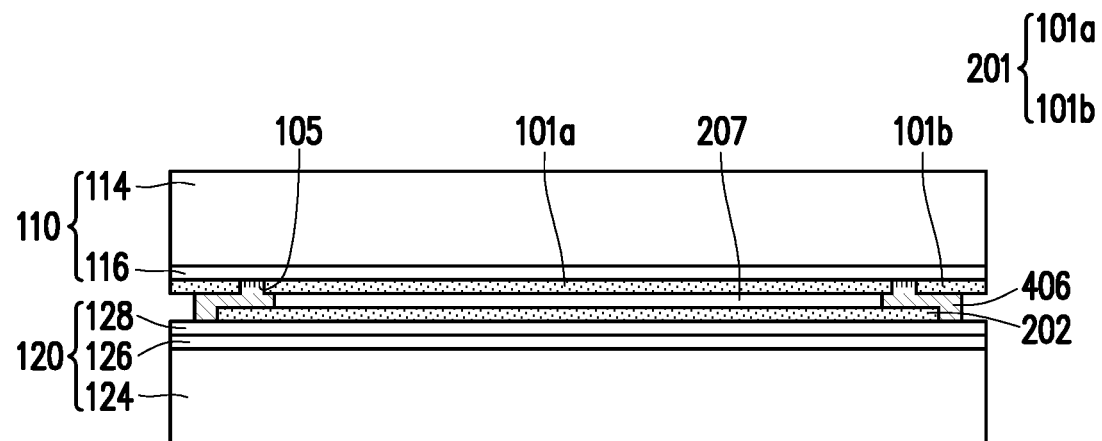

Regarding FIG. 5, the display panel 400 differs from the display panel 200 of FIG. 3E in that the edge of the second alignment layer 202 extends toward but does not reach the edge of the second substrate 120. Also particular to this embodiment, the sealant 406 and the display medium layer 207 covers the top and side surfaces of the second alignment layer 202 that are exposed after formation of second alignment layer 202. However, the present disclosure is not limited thereto. In some embodiments, the sealant covering the second alignment layer 202 may be narrower such that a portion of the second alignment layer 202 remains exposed. The second alignment layer 202 is formed in a similar manner to the first alignment layer 201 of the display panel 200 of FIG. 3E, wherein the second alignment layer 202 is patterned to the required pattern after being formed or formed directly in the required pattern.

Figure 6:
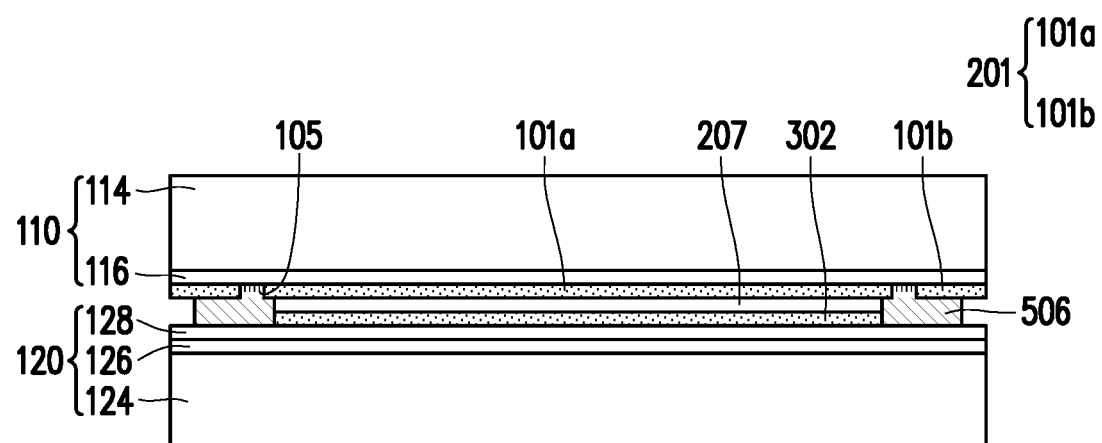

Regarding FIG. 6, the display panel 500 differs from the display panel 200 of FIG. 3E in that the edge of the second alignment layer 302 aligns with the edge of the display medium layer 207. In other words, the second alignment layer 302 extends within the area surrounded by the sealant 506. Therefore, the sealant 506 does not overlap the second alignment layer 302. The second alignment layer 302 is formed in a similar manner to the first alignment layer 201 of the display panel 200 of FIG. 3E, wherein the second alignment layer 302 is patterned to the required pattern after being formed or formed directly in the required pattern.

Figure 7:
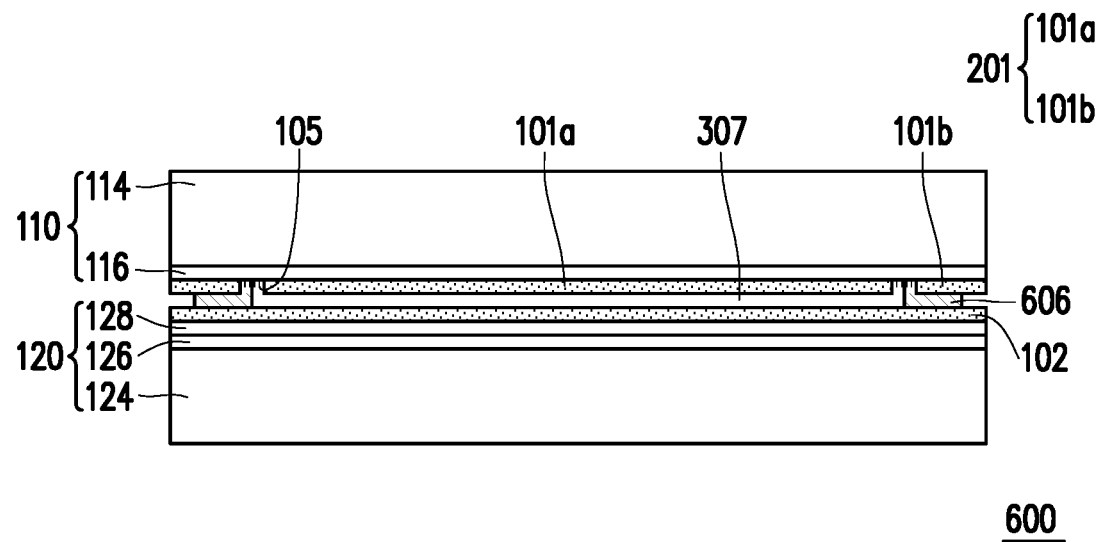

Regarding FIG. 7, the display panel 600 differs from the display panel 200 of FIG. 3E in that both the display medium layer 307 and the sealant 606 partially cover the hydrophobic surface 105. The formation of the display medium layer 307 and the sealant 606 may be similar to that of the display medium layer 207 and the sealant 206 of the display panel 200 of FIG. 3E.

Figure 8:
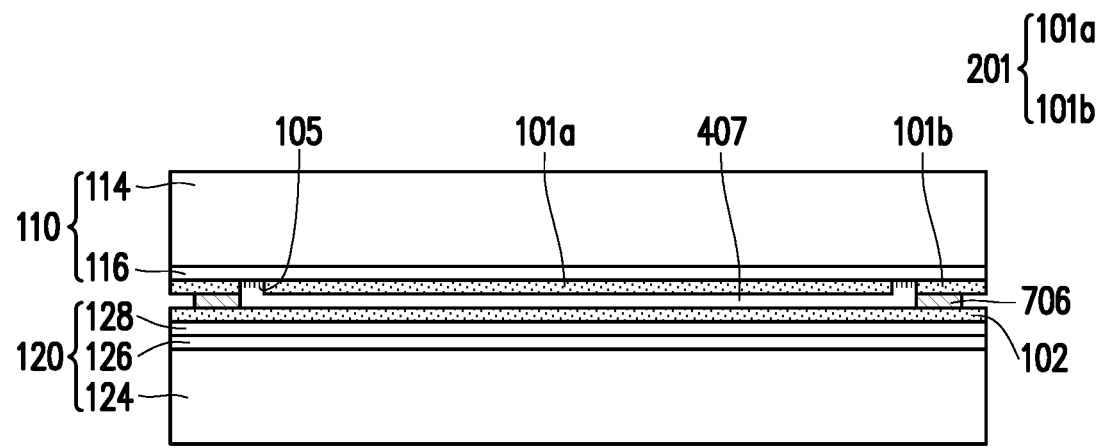

Regarding FIG. 8, the display panel 700 differs from the display panel 200 of FIG. 3E in that an inner edge of the sealant 706 aligns with a boundary between the outer portion 101b of the first alignment layer 201 and the hydrophobic surface 105, and the display medium layer 407 at least partially covers the hydrophobic surface 105. The formation of the display medium layer 407 and the sealant 706 may be similar to that of the display medium layer 207 and the sealant 206 of the display panel 200 of FIG. 3E.

FIGS. 9A to 9D are schematic cross-sectional views illustrating a manufacturing method of a display panel 800 according to an embodiment of the present disclosure. The manufacturing method of the display panel 800 of FIG. 9D may include the following steps, but the present disclosure is not limited thereto, and the order of the steps is also not limited to the here presented order of steps. The manufacturing method depicted in FIGS. 9A to 9D will be described omitting detail that is the same as that of the already described manufacturing method of the display panel 200 of FIGS. 3A to 3E.

Figure 9A:
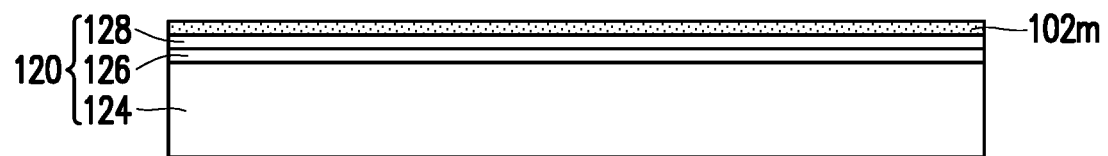
FIGS. 9A to 9D are schematic cross-sectional views illustrating a manufacturing method of a display panel according to an embodiment of the present disclosure.

Regarding FIG. 9A, a second substrate 120 including a second support plate 124, an active layer 126 and a passivation layer 128 is provided. The second substrate 120 may be similar to that depicted in FIG. 2 or FIG. 3E. A second alignment material layer 102m is disposed on the passivation layer 128 of the second substrate 120. The second alignment material layer 102m, including a material thereof, may be as described above for the first alignment material layer 101m of FIG. 3A.

Figure 9B:
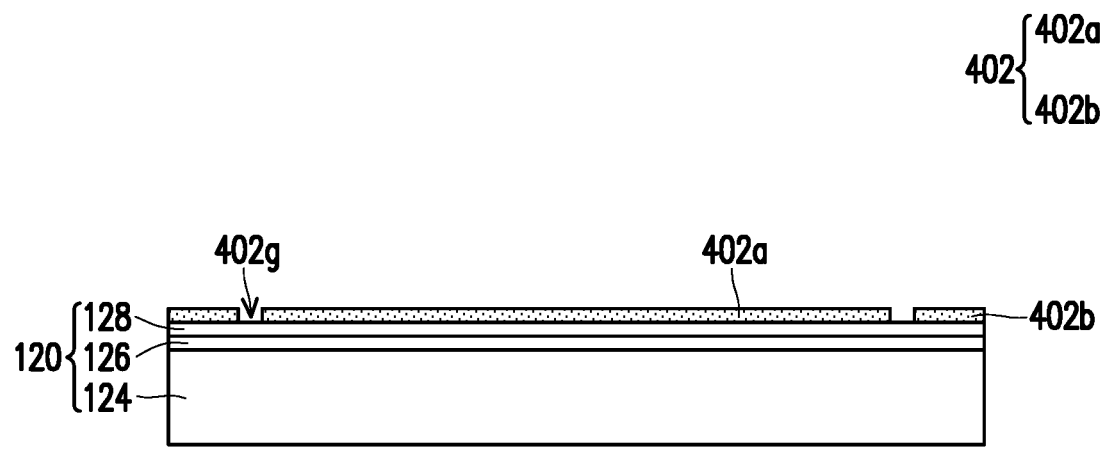

Regarding FIG. 9B, the second alignment material layer 102m is patterned to form a second alignment layer 402 having an individual central portion 402a and an outer portion 402b separate from the individual central portion 402a by a gap 402g. The second alignment layer 402 may be formed, patterned and have properties, including a thickness thereof, as described above for the first alignment layer 201 in relation to FIGS. 3A to 3B.

Figure 9C:
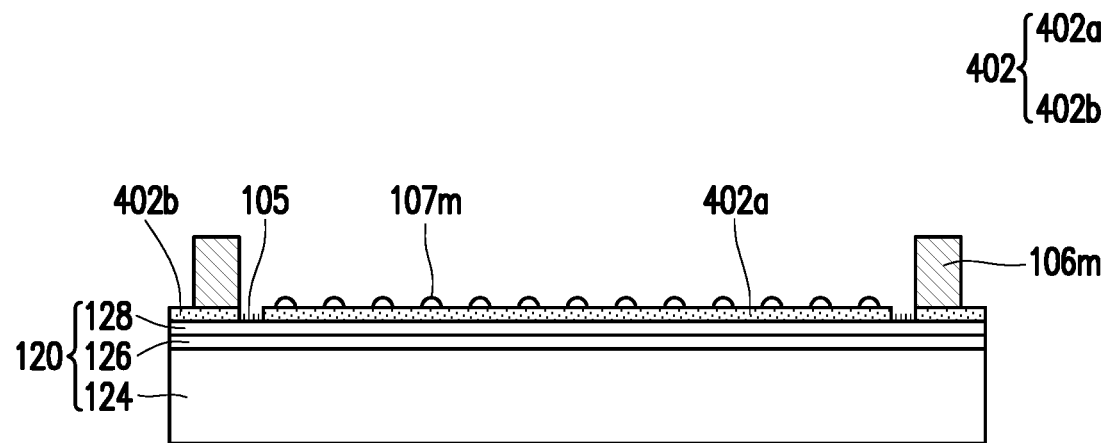

Regarding FIG. 9C, a sealant material 106m and a hydrophobic surface 105 are formed on the second substrate 120 and a display medium material 107m is disposed on the individual central portion 402a in a similar fashion to that described above in relation to FIGS. 3C to 3D, wherein in FIG. 9C the second substrate 120 and the second alignment layer 402 replace the first substrate 110 and the first alignment layer 201 respectively. The sealant material 106m, the hydrophobic surface 105 and the display medium material 107m may be similar to those depicted in FIGS. 3C to 3D.

Figure 9D:
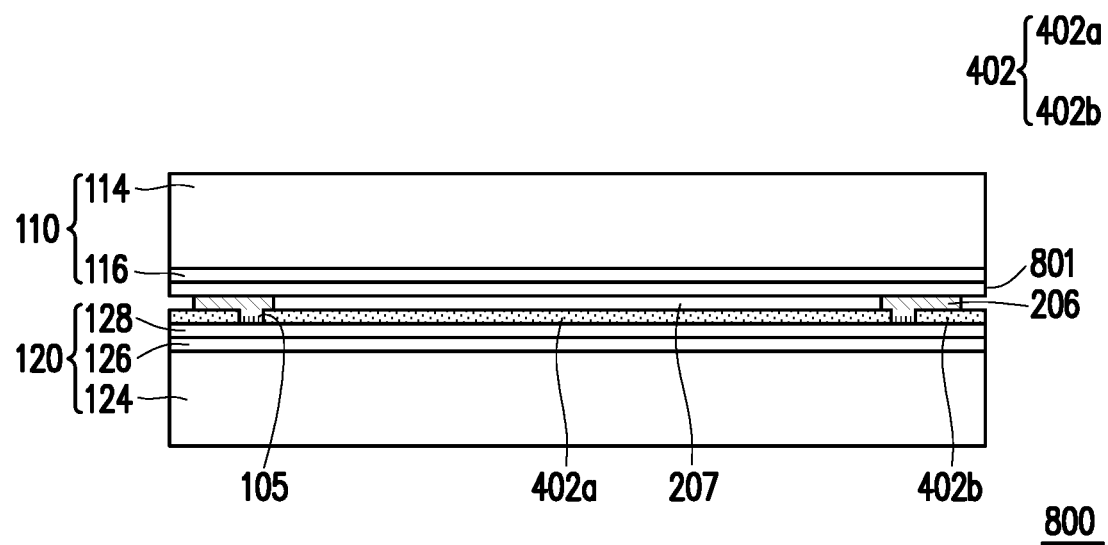

Regarding FIG. 9D, a first substrate 110 with a first alignment layer 801 fully covering a top surface thereof is provided. The first substrate 110 and the first alignment layer 801 may be otherwise similar to corresponding parts depicted in FIGS. 3E. Then, the first substrate 110 and the second substrate 120 are assembled via a sealant 206 formed from the sealant material 106m, as described above in relation to FIG. 3E. This method results in the display panel 800 having the hydrophobic surface 105 on the second substrate 120; that is, on the opposite substrate to that in the display panel 200 shown in FIG. 3E. In the embodiment, the sealant 206 may cover the hydrophobic surface 105 in the gap 402g and a portion of the individual central portion 402a, similarly to the sealant 206 of FIG. 3E covering the hydrophobic surface 105 in the gap 101g and a portion of the individual central portion 101a. In some embodiments, the sealant 206 may selectively extend to the edge of the individual central portion 402a as shown for the sealant 106 in FIG. 2, selectively expose a portion of the gap 402g as shown for the sealant 606 in FIG. 7, or align with the boundary between the gap 402g and the outer portion 402b as shown for the sealant 706 in FIG. 8. In addition, in some embodiments, the outer portion 402b of the second alignment layer 402 may be omitted and the sealant 206 may be in contact with the passivation layer 128 at the region outside the hydrophobic surface 105. Alternatively, the outer portion 402b of the second alignment layer 402 may not extend to the edge of the second substrate 120 and the sealant 206 may cover the top surface and the side surface of the outer portion 402b.

FIGS. 10A to 10D are schematic cross-sectional views illustrating a manufacturing method of a display panel 900 according to an embodiment of the present disclosure. The manufacturing method of the display panel 900 of FIG. 10D may include the following steps, but the present disclosure is not limited thereto, and the order of the steps is also not limited to the here presented order of steps. The manufacturing method depicted in FIGS. 10A to 10D will be described omitting detail that is the same as that of the already described manufacturing method of the display panel 200 of FIGS. 3A to 3E.

Figure 10A:
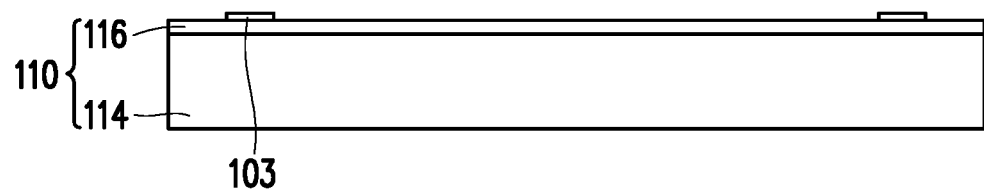
FIGS. 10A to 10D are schematic cross-sectional views illustrating a manufacturing method of a display panel according to an embodiment of the present disclosure.
Figure 10B:
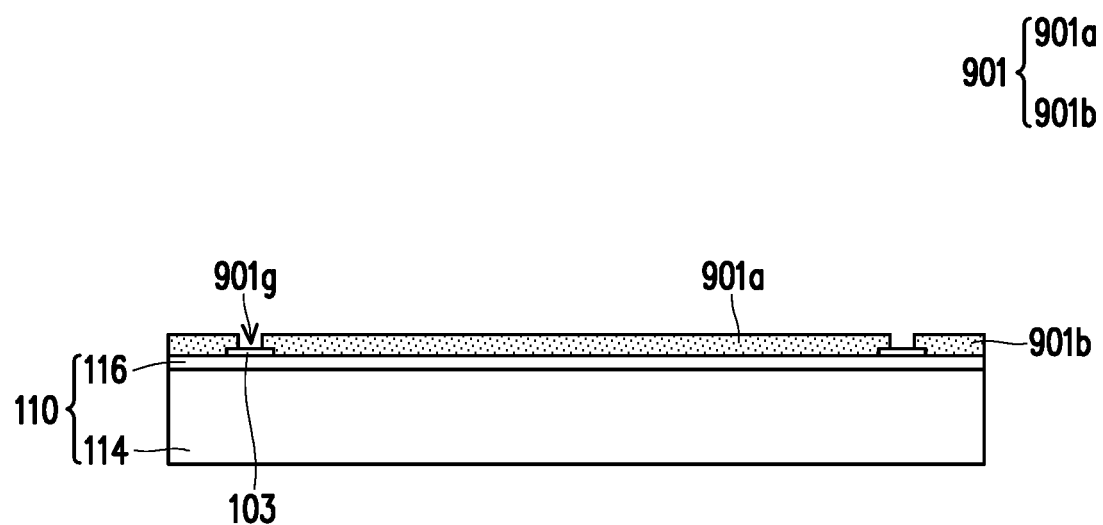

Regarding FIG. 10A and FIG. 10B, a first substrate 110 including a first support plate 114 and an electrode layer 116 is provided. The first substrate 110 may be similar to that depicted in FIG. 2 or FIG. 3E. In the embodiment, an inorganic layer 103 is disposed on the electrode layer 116 The inorganic layer 103 may be formed by evaporation, sputtering or atomic layer deposition (ALD). A material of the inorganic layer 103 may be an oxide, a metal oxide or a combination thereof, and may include silicon oxide, titanium oxide, aluminium oxide or the like. In some embodiments, the inorganic layer 103 may be a stacked structure with more than one inorganic material. The first alignment layer 901 is formed and properties thereof are as described above for the first alignment layer 201 in relation to FIGS. 3A to 3B. In this particular embodiment, the inorganic layer 103 is thinner than the first alignment layer 901. In the embodiment, the first alignment layer 901 includes an individual central portion 901a and an outer portion 901b and a gap 901g is formed in the first alignment layer 901 to separate the individual central portion 901a from the outer portion 901b. As shown in FIG. 10B, the gap 901g exposes at least a portion of the inorganic layer 103.

Figure 10C:
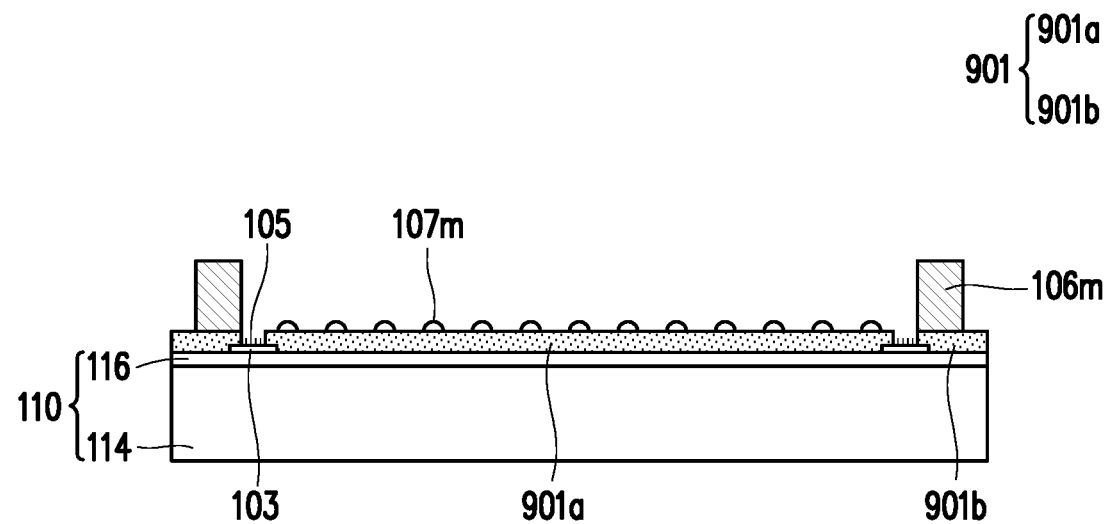

Regarding FIG. 10C, a hydrophobic surface treatment is performed. The material of the inorganic layer 103 may be different from a material of the first alignment layer 901 and their chemical reactivity towards the hydrophobic material used to form the hydrophobic surface 105 may be different, such that the hydrophobic surface 105 preferably forms on the inorganic layer 103 rather than the first alignment layer 901. For example, the inorganic layer 103 may include material that has surface hydroxyl groups to facilitate the formation of the hydrophobic surface 105. Therefore, the exposed portion of the inorganic layer 103 may be modified to be functionalized with hydrophobic material to form a hydrophobic surface 105 in the gap 901g on the inorganic layer 103. In addition, a sealant material 106m is formed on the first substrate 110 and a display medium material 107m is disposed on the individual central portion 901a of the first alignment layer 901 as described above in relation to FIG. 3D, wherein the hydrophobic surface 105, the sealant material 106m and the display medium material 107m may be similar to those depicted in FIG. 3D.

Figure 10D:
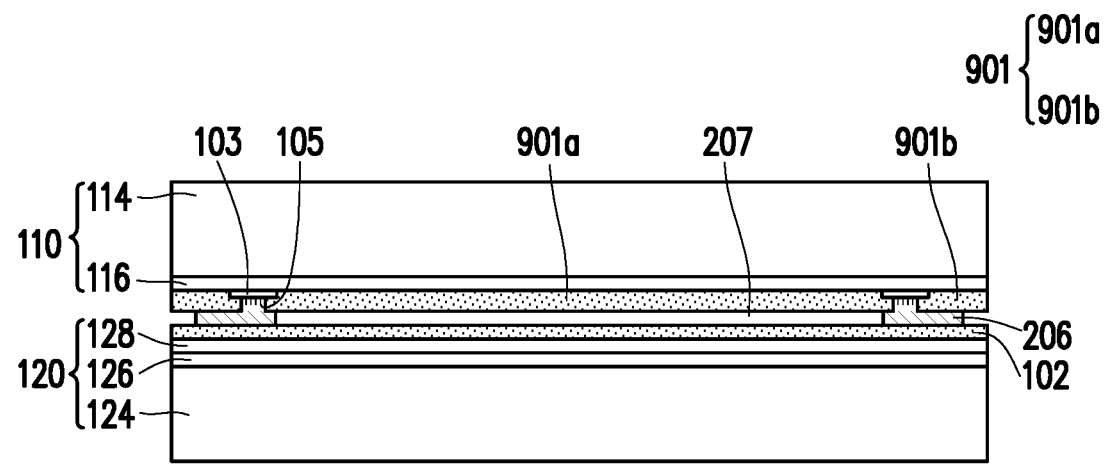

Regarding FIG. 10D, a second substrate 120 is provided, and the first substrate 110 and the second substrate 120 are assembled via the sealant 206 as described above in relation to FIG. 3E, wherein the second substrate 120 may be similar to that depicted in FIG. 3E. This results in the display panel 900 having the hydrophobic surface 105 on the inorganic layer 103 disposed on the first substrate 110. The sealant 206, the hydrophobic surface 105 and the first alignment layer 901 may be similar to those depicted in any of FIGS. 2, 7 and 8.

FIGS. 11 to 17 each schematically illustrate a cross section of a display panel according to an embodiment of the present disclosure. Regarding FIGS. 11 to 17, each of the display panels 1000 to 1600 is similar to the display panel 900 of FIG. 10D. Each of the display panels 1000 to 1600 includes a first substrate 110, a second substrate 120 and a hydrophobic surface 105. The display panel 1000 in FIG. 11 further includes a display medium layer 207, a sealant 906, a first alignment layer 1001 having an individual central portion 901a, a second alignment layer 102 and an inorganic layer 103. The display panel 1100 in FIG. 12 further includes a display medium layer 207, a sealant 106, a first alignment layer 1001 having an individual central portion 901a, a second alignment layer 102 and an inorganic layer 203. The display panel 1200 in FIG. 13 further includes a display medium layer 207, a sealant 1006, a first alignment layer 1001 having an individual central portion 901a, a second alignment layer 102 and an inorganic layer 303. The display panel 1300 in FIG. 14 further includes a display medium layer 207, a sealant 1006, a first alignment layer 1001 having an individual central portion 901a, a second alignment layer 102 and an inorganic layer 403. The display panel 1400 in FIG. 15 further includes a display medium layer 107, a sealant 1106, a first alignment layer 201 having an individual central portion 101a and an outer portion 101b, a second alignment layer 102 and an inorganic layer 503. The display panel 1500 in FIG. 16 further includes a display medium layer 107, a sealant 1206, a first alignment layer 201 having an individual central portion 101a and an outer portion 101b, a second alignment layer 102 and an inorganic layer 603. The display panel 1600 in FIG. 17 further includes a display medium layer 207, a sealant 206, a first alignment layer 801, a second alignment layer 902 having an individual central portion 902a and an outer portion 902b and an inorganic layer 703. The first substrate 110, the second substrate 120, the respective display medium layer, the respective sealant, the respective first alignment layer, the respective second alignment layer, the hydrophobic surface 105 and the respective inorganic layer may be similar to those depicted in FIG. 10D. Each of the embodiments depicted in FIGS. 11 to 17 will be described in turn omitting detail that is the same as previously described embodiments.

Figure 11:
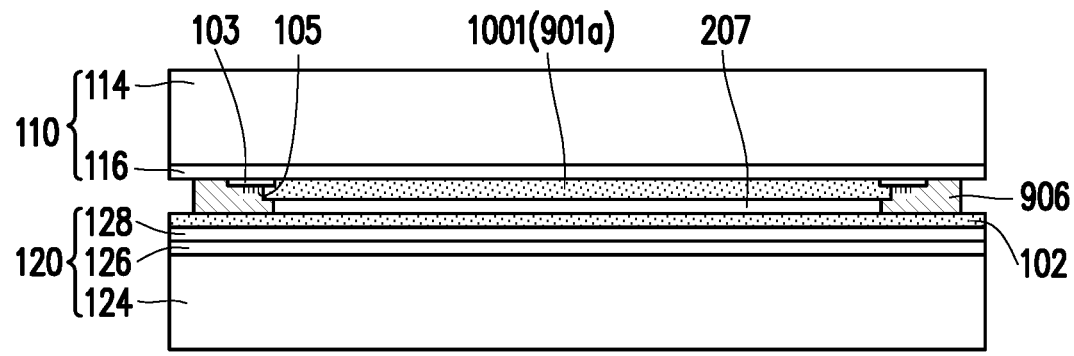
FIGS. 11 to 17 each schematically illustrate a cross section of a display panel according to an embodiment of the present disclosure.

Regarding FIG. 11, the display panel 1000 differs from the display panel 100 of FIG. 2 in that there is the inorganic layer 103 disposed therein. A portion of the inorganic layer 103 is disposed between the electrode layer 116 of the first substrate 110 and the individual central portion 901a of the first alignment layer 1001, and the other portion of the inorganic layer 103 including the hydrophobic surface 105 is disposed between the electrode layer 116 and the sealant 906. The inorganic layer 103 extends beyond an outer edge of the hydrophobic surface 103 thereon toward the edge of the first substrate 110. In other words, the sealant 906 covers the top and side surface of a portion of the inorganic layer 103 between the hydrophobic surface 105 and the edge of the first substrate 110. The inorganic layer 103 including the hydrophobic surface 105 are formed and the properties thereof are as described above for the display panel 900 in relation to FIGS. 10A-10C.

Figure 12:
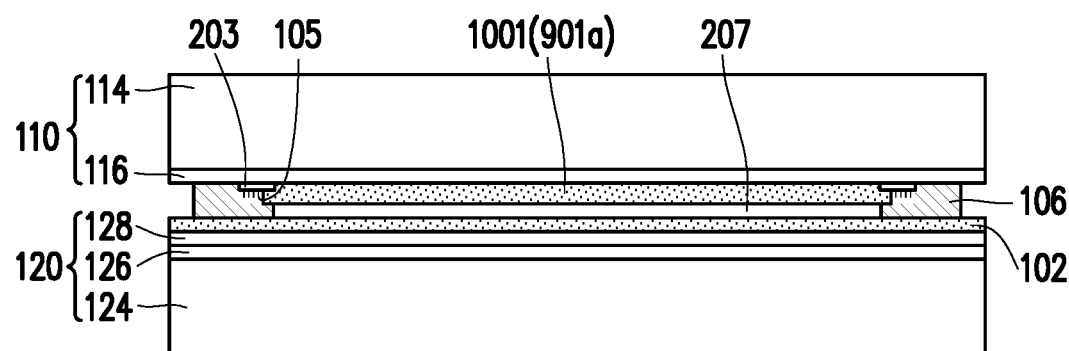

Regarding FIG. 12, the display panel 1100 differs from the display panel 1000 of FIG. 11 in that an edge of the inorganic layer 203 is aligned with the outer edge of the hydrophobic surface 105. The inorganic layer 203 is otherwise the same as the inorganic layer 103.

Figure 13:
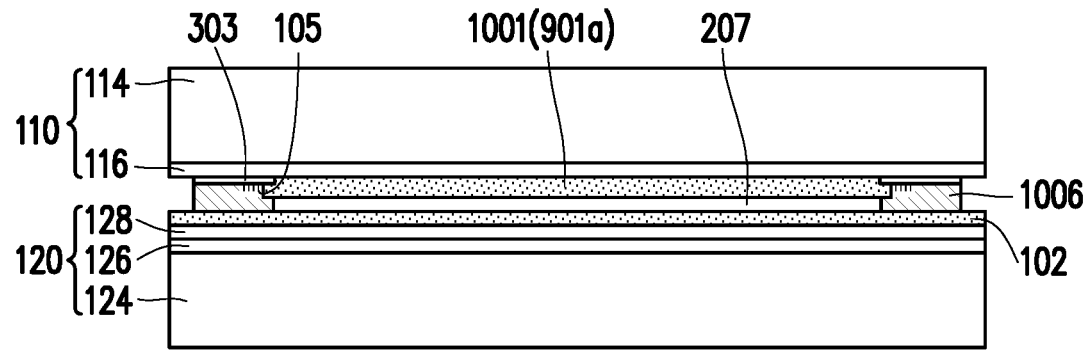

Regarding FIG. 13, the display panel 1200 differs from the display panel 1000 of FIG. 11 in that an edge of the inorganic layer 303 is aligned with the outer edge of the sealant 1006. The inorganic layer 303 is otherwise the same as the inorganic layer 103.

Figure 14:
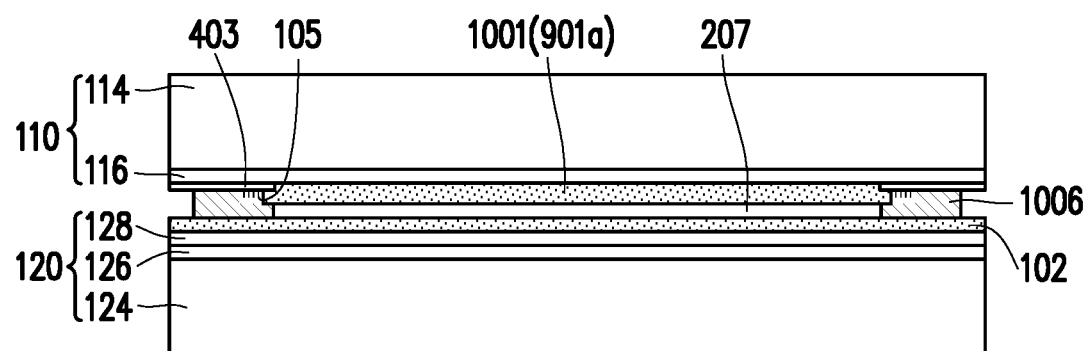

Regarding FIG. 14, the display panel 1300 differs from the display panel 1000 of FIG. 11 in that an edge of the inorganic layer 403 is aligned with an edge of the first substrate 110. The inorganic layer 403 is otherwise the same as the inorganic layer 103.

Figure 15:
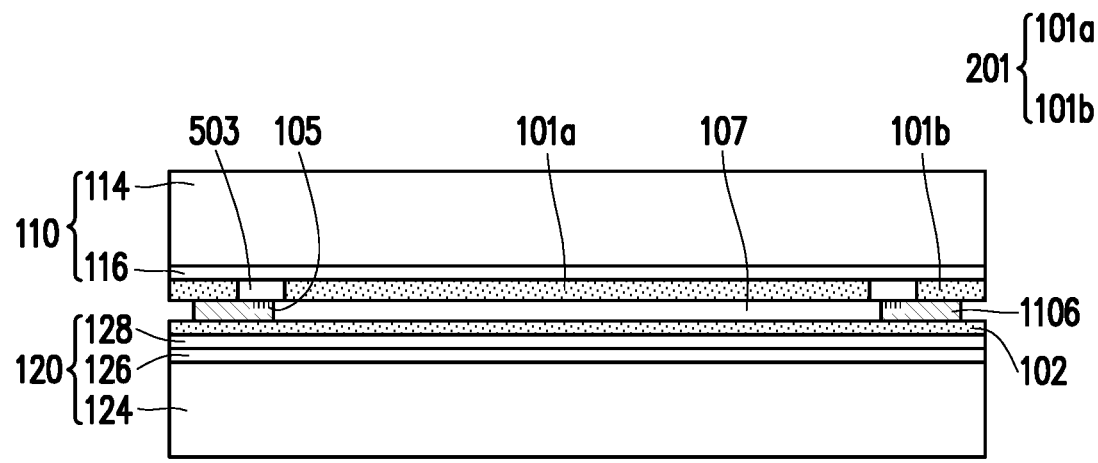

Regarding FIG. 15, the display panel 1400 differs from the display panel 900 of FIG. 10D in that a thickness of the inorganic layer 503 is substantially the same as a thickness of the first alignment layer 201. The inorganic layer 503 is otherwise the same as the inorganic layer 103. In the embodiment, the hydrophobic surface 105 is formed on at least a portion of the inorganic layer 503 to face the sealant 1106. The hydrophobic surface 105 is otherwise as described in previous embodiments.

Figure 16:
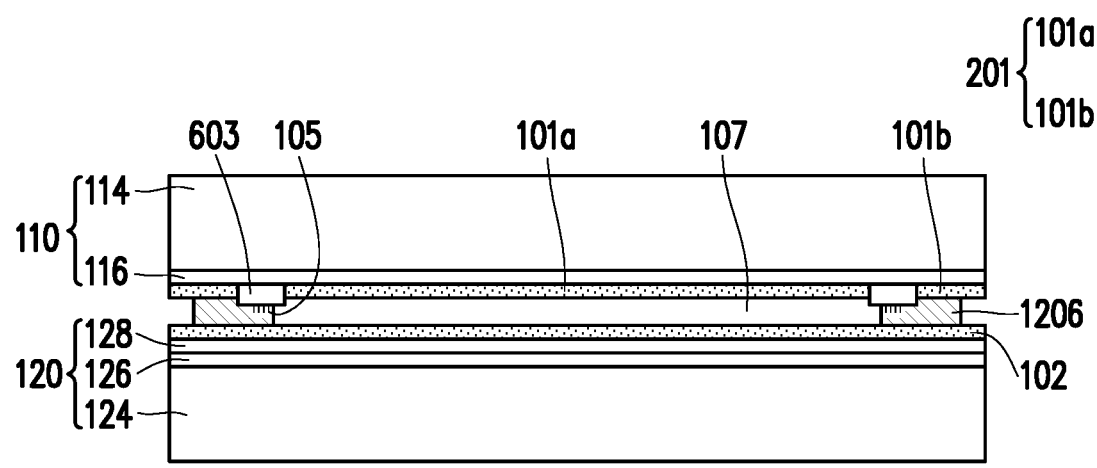

Regarding FIG. 16, the display panel 1500 differs from the display panel 1400 of FIG. 15 in that the inorganic layer 603 is thicker than the first alignment layer 201. The inorganic layer 603 is otherwise the same as the inorganic layer 503.

Figure 17:
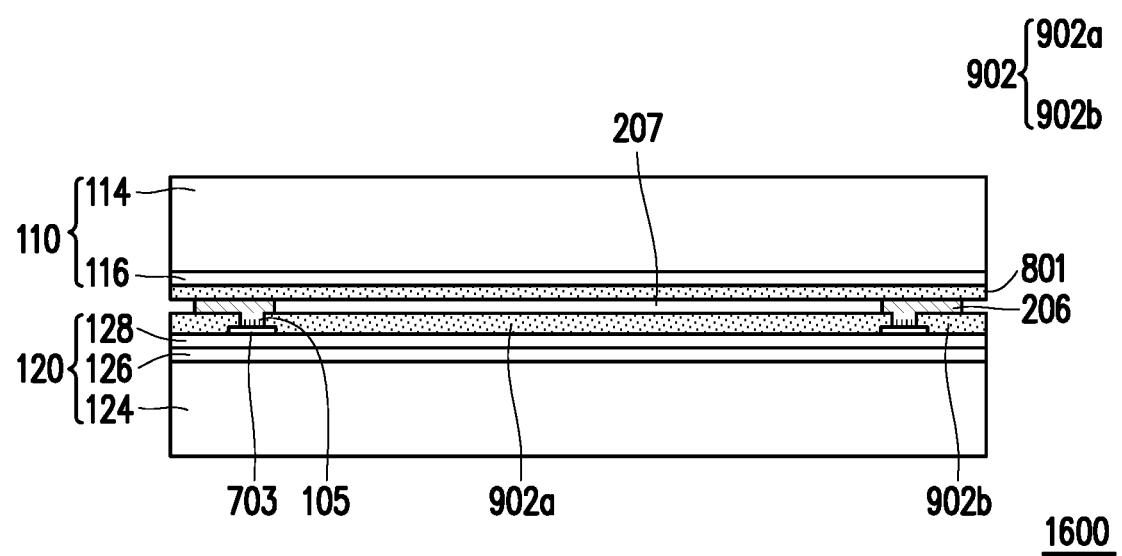

Regarding FIG. 17, the display panel 1600 differs from the display panel 800 of FIG. 9D in that the inorganic layer 703 is disposed on the passivation layer 128 of the second substrate 120, before forming the second alignment layer 902 thereon. The inorganic layer 703 including the hydrophobic surface 105 and the second alignment layer 902 are otherwise the same as the inorganic layer 103 of FIG. 10D and the second alignment layer 402 of FIG. 9D respectively.

FIGS. 18A to 18D are schematic cross-sectional views illustrating a manufacturing method of a display panel 1700 according to an embodiment of the present disclosure. The manufacturing method of the display panel 1700 of FIG. 18D may include the following steps, but the present disclosure is not limited thereto, and the order of the steps is also not limited to the here presented order of steps. The manufacturing method depicted in FIGS. 18A to 18D will be described omitting detail that is the same as that of the already described manufacturing method of a display panel 800 of FIGS. 9A to 9D.

Figure 18A:
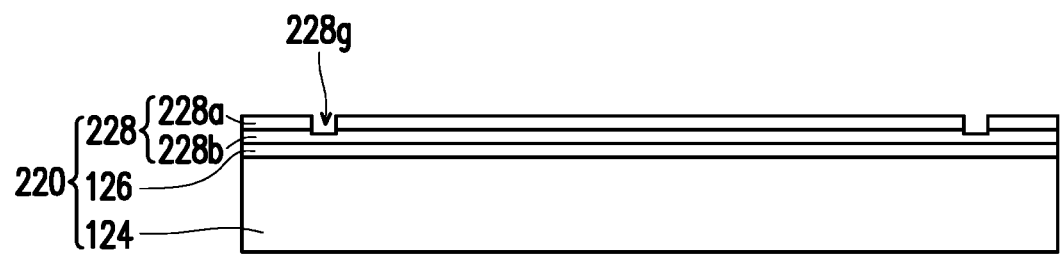
FIGS. 18A to 18D are schematic cross-sectional views illustrating a manufacturing method of a display panel according to an embodiment of the present disclosure.

Regarding FIG. 18A, a second substrate 220 including a second support plate 124, an active layer 126, and a passivation layer 228 is provided. The second substrate 220 differs from the second substrate 120 of FIG. 9A in that the passivation layer 228 includes a first inorganic layer 228a and a second inorganic layer 228b. The second inorganic layer 228b is disposed on the active layer 126 and between the active layer 126 and the first inorganic layer 228a. In this particular embodiment, a material of the first inorganic layer 228a is different to a material of the second inorganic layer 228b. For example, a material of the first inorganic layer 228a includes silicon nitride and a material of the second inorganic layer 228b includes silicon oxide. However, the present disclosure is not limited thereto. The first inorganic layer 228a has a gap 228g revealing a portion of the second inorganic layer 228b.

Figure 18B:
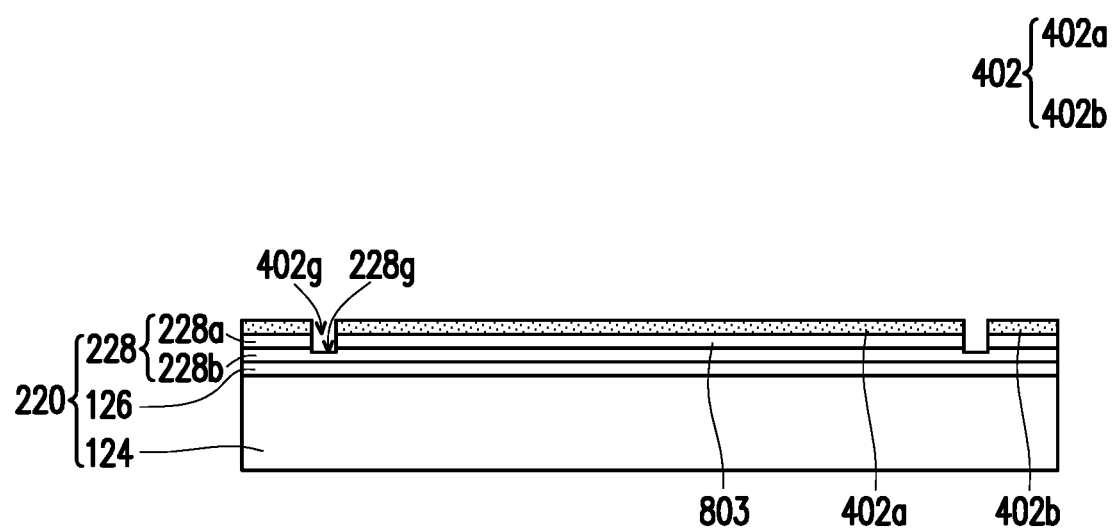

Regarding FIG. 18B, a second alignment layer 402 is formed on the first organic layer 228a. The second alignment layer 402 is formed with a desired pattern, that is with a gap 402g separating an individual central portion 402a from an outer portion 402b of the second alignment layer 402, the gap 402g corresponding with the gap 228g below. That is, after forming the second alignment layer 402, the gap 228g is exposed by the gap 402g. However, the present disclosure is not limited thereto. In some embodiments, the first inorganic layer 228a, the second inorganic layer 228b and the second alignment layer 402 may be formed first, before the gap 228g and gap 402g are formed, for example, in one step.

Figure 18C:
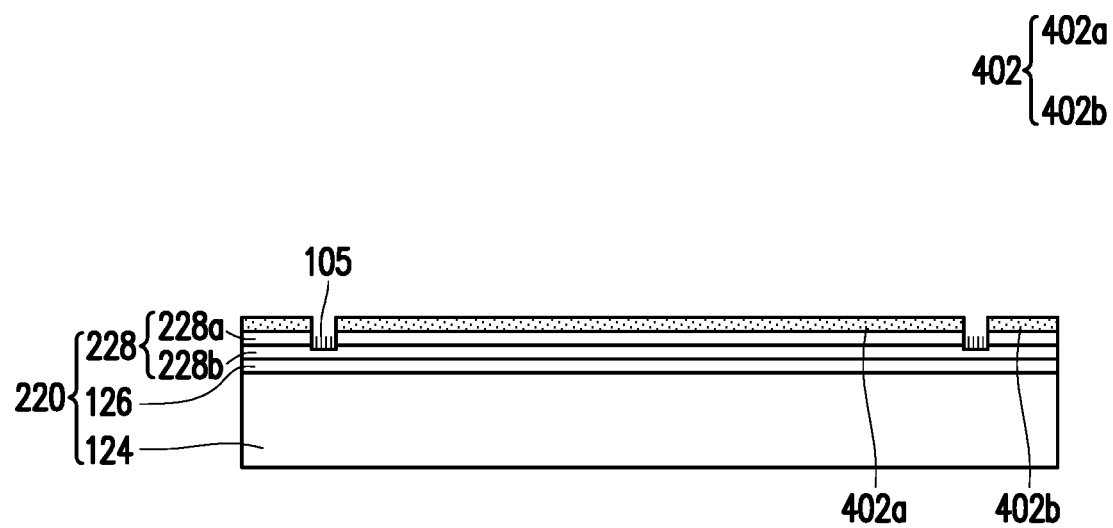
Figure 18D:
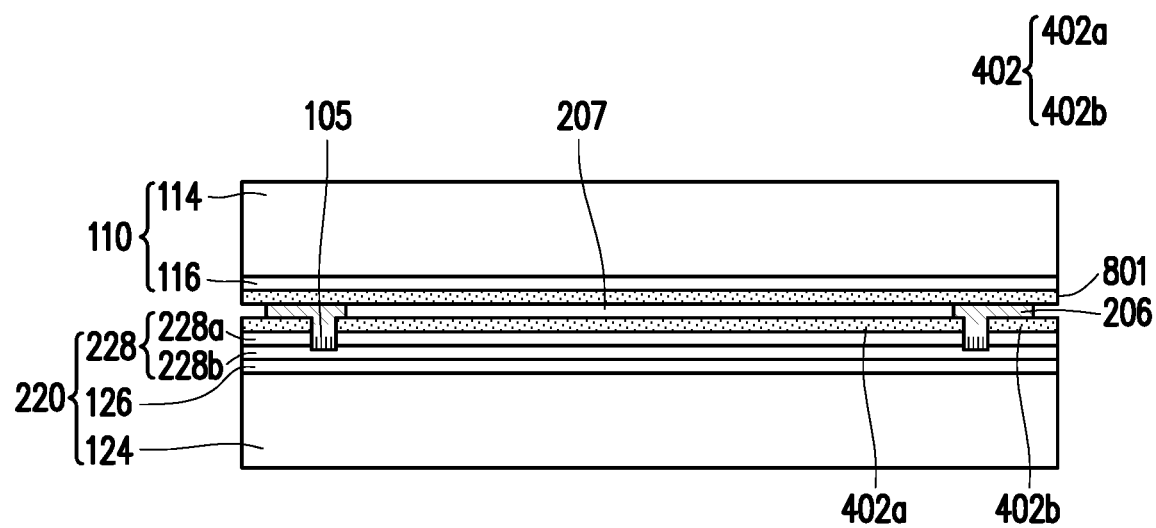

Regarding FIG. 18C and FIG. 18D, at least a portion of the surface of the second inorganic layer 228b exposed by the gap 228g and the gap 402g forms a hydrophobic surface 105. In some embodiments, the hydrophobic surface 105 is formed by performing a surface treatment on the portion of the surface of the second inorganic layer 228b exposed by the gap 228g and the gap 402g. In some further embodiments, the hydrophobic surface 105 is formed in the gap 228g before the second alignment layer 402 is formed. For example, in the step of FIG. 18A, the second inorganic layer 228b is functionalized with hydrophobic material and the first organic layer 228a is formed on the functionalized second inorganic layer 228b. Thereafter, the gap 228g is formed to expose a portion of the functionalized surface of the second inorganic layer 228b to serve as the hydrophobic surface 105.

Subsequent steps for manufacturing the display panel 1700 are the same as described for the display panel 800 in relation to FIGS. 9C to 9D, with further parts of the display panel 1700 depicted in FIG. 18D and any intermediary versions thereof the same as or similar to corresponding ones depicted in FIGS. 9C to 9D. This method results in the display panel 1700 having the hydrophobic surface 105 on the second inorganic layer 228b in the gap 228g.

Figure 19:
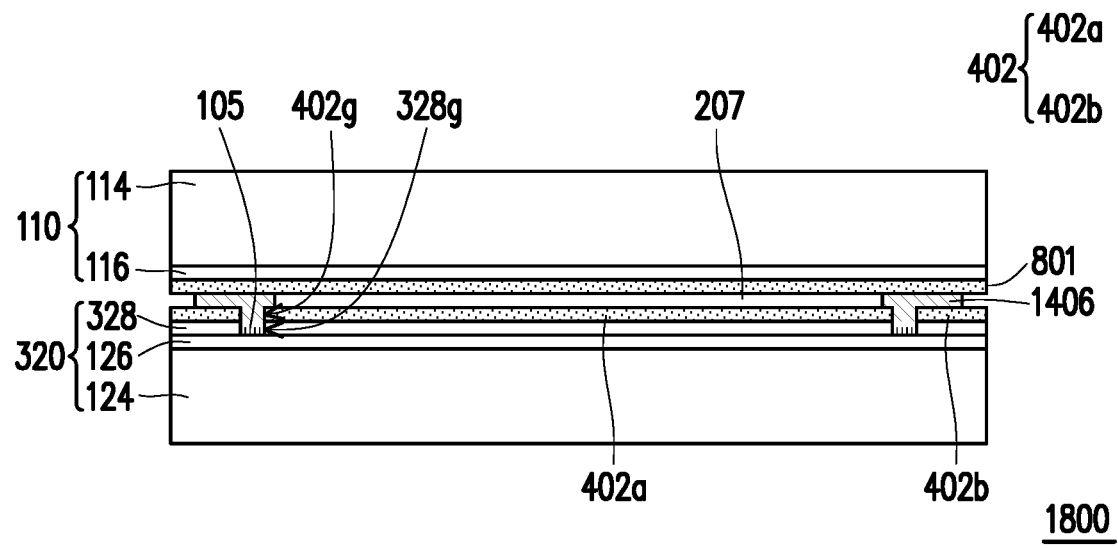
FIGS. 19 and 20 each schematically illustrate a cross section of a display panel according to an embodiment of the present disclosure.
Figure 20:
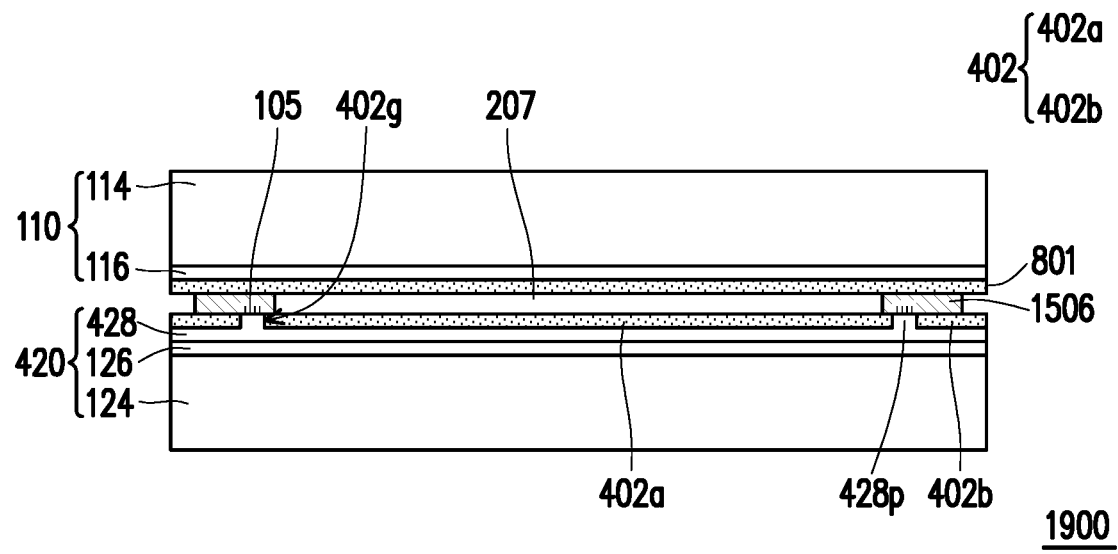

FIGS. 19 and 20 each schematically illustrates a cross section of a display panel according to an embodiment of the present disclosure. Referring to FIGS. 19 and 20, the display panels 1800 and 1900 are similar to the display panel 800 of FIG. 9D. Each of the display panels 1800 and 1900 includes a first substrate 110, a display medium layer 207, a first alignment layer 801, a second alignment layer 402 having an individual central portion 402a and an outer portion 402b and a hydrophobic surface 105. The display panel 1800 in FIG. 19 further includes a second substrate 320 and a sealant 1406. The second substrate 320 includes a passivation layer 328 and an active layer 126. The display panel 1900 in FIG. 20 further includes a second substrate 420 and a sealant 1506. The second substrate 420 includes a passivation layer 428 having a protrusion 428p, and the hydrophobic layer 105 is the top surface of the protrusion 428p. The first substrate 110, the respective second substrate, the display medium layer 207, the respective sealant, the first alignment layer 801, the second alignment layer 402 and the hydrophobic surface 105 may be similar to corresponding parts depicted in FIG. 9D. Each of the embodiments depicted in FIGS. 19 and 20 will be described in turn omitting detail that is the same as previously described embodiments.

Regarding FIG. 19, the display panel 1800 differs from the display panel 800 of FIG. 9D in that the passivation layer 328 of the second substrate 320 has a gap 328g corresponding to the gap 402g of the second alignment layer 402 and extending through the passivation layer 328 to the active layer 126. Furthermore, at least a portion of the surface of the active layer 126 exposed by the gap 328g of the passivation layer 328 is functionalized by a hydrophobic material and serves as the hydrophobic surface 105.

Regarding FIG. 20, the display panel 1900 differs from the display panel 800 of FIG. 9D in that the passivation layer 428 of the second substrate 420 has a protrusion 428p corresponding to the gap 402g of the second alignment layer 402. In this particular embodiment, the protrusion 428p of the passivation layer 428 may extend to a height aligned with a top surface of the second alignment layer 402. However, the present disclosure is not limited thereto. In some embodiments, the height of the protrusion 428p may be different from a thickness of the second alignment layer 402. In some embodiments, the protrusion 428p of the passivation layer 428 may be formed as an extra patterned layer on top of a base layer, wherein the patterned layer and the base layer are of a same material. In some embodiments, a passivation material layer is formed and then a top portion of the passivation material layer is selectively removed through patterning, which may be by etching, to form the passivation layer 428 having the protrusion 428p. Furthermore, at least a portion of a top surface of the protrusion 428p of the passivation layer 428 is functionalized with hydrophobic material to serve as the hydrophobic surface 105. The second alignment layer 402 is then formed on the passivation layer 428 and does not cover the hydrophobic surface 105.

FIGS. 21A to 21D are schematic cross-sectional views illustrating a manufacturing method of a display panel 2000 according to an embodiment of the present disclosure. The manufacturing method of the display panel 2000 of FIG. 21D may include the following steps, but the present disclosure is not limited thereto, and the order of the steps is also not limited to the here presented order of steps. The manufacturing method depicted in FIGS. 21A to 21D will be described omitting detail that is the same as that already described in previous embodiments, in particular the manufacturing method of a display panel 200 of FIGS. 3A to 3E.

Figure 21A:
FIGS. 21A to 21D are schematic cross-sectional views illustrating a manufacturing method of a display panel according to an embodiment of the present disclosure.
Figure 21B:
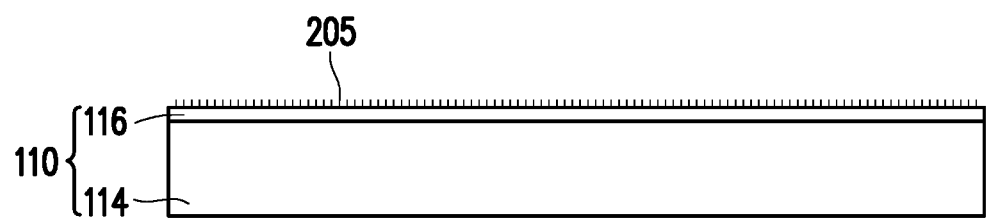
Figure 21C:
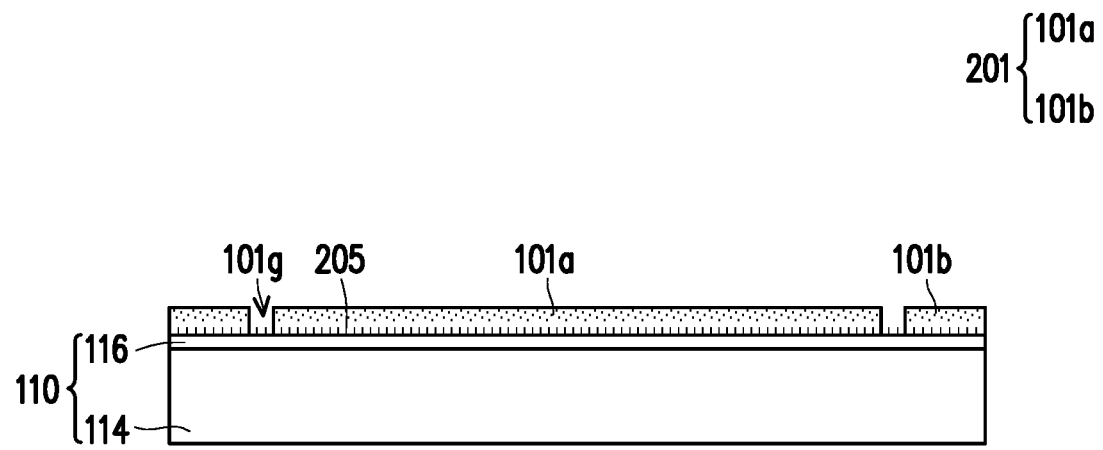

Regarding FIGS. 21A to 21C, a first substrate 110 including a first support plate 114 and an electrode layer 116 disposed on the first support plate 114 is provided. The first substrate 110 may be similar to that depicted in FIG. 3E. Before a first alignment layer is formed on the first substrate 110, a hydrophobic surface 205 shown in FIG. 21B is formed on a top surface of the electrode layer 116 of the first substrate 110 facing away from the first support plate 114. Herein, the hydrophobic surface 205 may be formed by performing a surface treatment on the top surface of the electrode layer 116 so that the top surface of the electrode layer 116 is functionalized by hydrophobic material to serve as the hydrophobic surface 205. In this particular embodiment, the hydrophobic surface 205 is formed on the entirety of the top surface of the electrode layer 116, but the present disclosure is not limited thereto. The hydrophobic surface 205 may otherwise be formed only on a portion of the top surface of the electrode layer 116 similarly to how the hydrophobic surface 105 of the display panel 200 of FIG. 3C is formed. After forming the hydrophobic surface 205, a first alignment layer 201, as shown in FIG. 21C, is formed on the first substrate 110. The first alignment layer 201 has a gap 101g exposing a portion of the hydrophobic surface 205 and the gap 101g separates an individual central portion 101a from an outer portion 101 of the first alignment layer 201. In other embodiments, an extension of the hydrophobic surface 205 underlying the first alignment layer 201 may include at least the surface of the electrode layer 116 exposed by the gap 101g up to the entire surface of the electrode layer 116 facing the first alignment layer 201. For example, the hydrophobic surface 205 may extend in the gap 101g and under the individual central portion 101a of the first alignment layer 201, or may extend in the gap 101g and under the outer portion 101b of the first alignment layer 201. The first alignment layer 201 is formed and properties thereof are as described for the display panel 200 in relation to FIG. 3B.

Figure 21D:
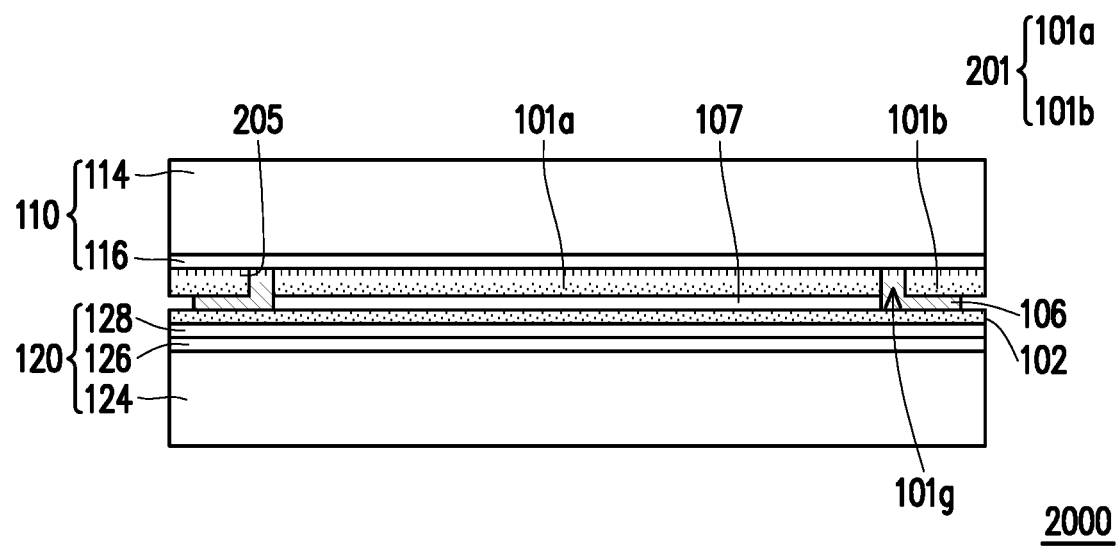

Regarding FIG. 21D, subsequent steps for manufacturing the display panel 2000 are the same as described for the display panel 200 in relation to FIGS. 3D to 3E, with further parts depicted in FIG. 21D and any intermediary versions thereof being the same as or similar to corresponding ones depicted in FIGS. 3D and 3E. This method results in the display panel 2000 having the hydrophobic surface 205 on the entirety of the surface of the electrode layer 116 facing the display medium layer 107 and the sealant 106 and under the first alignment layer 201. However, only a portion of the hydrophobic surface 205 surrounding the individual central portion 101a of the first alignment layer 201 is exposed by the first alignment layer 201. In the embodiment, the sealant 106 may cover the hydrophobic surface 205 at the gap 101g and an inner edge of the sealant 106 may be aligned with the edge of the individual central portion 101a. In some embodiments, the sealant 106 may selectively cover a portion of the individual central portion 101a similarly to the sealant 206 shown in FIG. 3E, selectively cover only a portion of the gap 101g similarly to the sealant 606 of FIG. 7, or align with the boundary between the gap 101g and the outer portion 110b similarly to the sealant 706 shown in FIG. 8.

In view of the above, at least the hydrophobic surface adjacent to the individual central portion of at least one of the first alignment layer and the second alignment layer restricts an extent of the display medium material during manufacturing of the display panel to prevent or reduce contact between the display medium material and the uncured sealant, and therefore prevent or reduce contamination of the display medium layer by the uncured sealant. An edge of the individual central portion of the at least one of the first alignment layer and the second alignment layer may also help to restrict an extent of the display medium layer to prevent or reduce contact between the display medium layer and the uncured sealant.

Accordingly, the hydrophobic surface and an edge of the individual central portion of the at least one of the first alignment layer and the second alignment layer prevent or reduce the degradation in performance of the display panel that may be caused by contamination of the display medium layer through contact of the display medium layer with the uncured sealant.

It will be apparent to those skilled in the art that various modifications and variations can be made to the embodiments and concepts disclosed herein without departing from the scope or spirit of the invention. In view of the foregoing, it is intended that the present disclosure cover modifications and variations of this invention provided they fall within the scope of the following claims and their equivalents.

What is claimed is:

1. A method of fabricating a display panel, comprising:
providing a first substrate and a second substrate;
forming an alignment material layer on one of the first substrate and the second substrate and patterning the alignment material layer to form an individual central portion;
forming a hydrophobic surface extending from an edge of the individual central portion toward an edge of the one of the first substrate and the second substrate;
forming a sealant material on the one of the first substrate and the second substrate, wherein a gap separates the sealant material from the individual central portion and the hydrophobic surface extends in the gap;
dropping a display medium material on the individual central portion, wherein the display medium material is restricted by the hydrophobic surface and does not contact the sealant material;
assembling the first substrate and the second substrate with the sealant material; and
curing the sealant material to form a sealant,
wherein the sealant covers the hydrophobic surface and partially covers the individual central portion.

2. The method of claim 1, wherein the hydrophobic surface is formed by performing a hydrophobic modification on a portion of the one of the first substrate and the second substrate and the gap exposes the portion of the one of the first substrate and the second substrate.

3. The method of claim 1, further comprising forming an inorganic layer on the one of the first substrate and the second substrate, wherein the gap between the individual central portion and the sealant material exposes the inorganic layer.

4. The method of claim 3, wherein the hydrophobic surface is formed by performing a hydrophobic modification on the inorganic layer.

5. The method of claim 1, wherein the alignment material layer is applied entirely on the one of the first substrate and the second substrate and patterned to form an alignment layer, and the alignment layer comprises the individual central portion and an outer portion, wherein the gap separates the outer portion from the individual central portion.

6. The method of claim 5, wherein the hydrophobic surface is formed by performing a hydrophobic modification on a portion of the one of the first substrate and the second substrate and the gap exposes the portion.

* * * * *